US011582487B2

(12) United States Patent
Zhao et al.

(10) Patent No.: US 11,582,487 B2
(45) Date of Patent: *Feb. 14, 2023

(54) METHOD AND APPARATUS FOR IMPROVED COMPOUND ORTHONORMAL TRANSFORM

(71) Applicant: TENCENT AMERICA LLC, Palo Alto, CA (US)

(72) Inventors: Xin Zhao, San Diego, CA (US); Xiang Li, Los Gatos, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/484,345

(22) Filed: Sep. 24, 2021

(65) Prior Publication Data

US 2022/0030279 A1 Jan. 27, 2022

Related U.S. Application Data

(63) Continuation of application No. 16/381,470, filed on Apr. 11, 2019, now Pat. No. 11,166,044.

(Continued)

(51) Int. Cl.
*H04N 19/625* (2014.01)
*H04N 19/176* (2014.01)
(Continued)

(52) U.S. Cl.
CPC ......... *H04N 19/625* (2014.11); *H04N 19/107* (2014.11); *H04N 19/122* (2014.11); *H04N 19/176* (2014.11)

(58) Field of Classification Search
CPC .. H04N 19/625; H04N 19/176; H04N 19/107; H04N 19/122; H04N 19/124; H04N 19/186; H04N 19/593
See application file for complete search history.

(56) References Cited

U.S. PATENT DOCUMENTS

2003/0156648 A1* 8/2003 Holcomb ............ H04N 19/513 375/E7.199
2017/0094314 A1* 3/2017 Zhao ................... H04N 19/159
(Continued)

OTHER PUBLICATIONS

"Series H: Audiovisual and Multimedia Systems Infrastructure of audiovisual services—Coding of moving video", ITU-T, H. 265, Dec. 2016, 664 pages.

(Continued)

*Primary Examiner* — Joseph Suh
(74) *Attorney, Agent, or Firm* — Sughrue Mion, PLLC

(57) ABSTRACT

A method of controlling residual coding for decoding or encoding of a video sequence, is performed by at least one processor and includes determining whether a small transform size of a primary transform is to be used for the residual coding of a coded block of the video sequence. The method further includes based on the small transform size of the primary transform being determined to be used, identifying, as the primary transform, a first transform set including discrete sine transform (DST)-4 and discrete cosine transform (DCT)-4, based on the small transform size of the primary transform being determined to not be used, identifying, as the primary transform, a second transform set including DST-7 and DCT-8, and performing the residual coding of the coded block, using the identified primary transform.

20 Claims, 10 Drawing Sheets

600
Start
610
Yes
Determining whether small transform size is to be used for residual coding
No
620
Identifying, as primary transform, first transform set including DST-4 and DCT-4
630
Identifying, as primary transform, second transform set including DST-7 and DCT-8
640
Performing residual coding of coded block, using identified primary transform
End

Related U.S. Application Data

(60) Provisional application No. 62/712,818, filed on Jul. 31, 2018.

(51) Int. Cl.
*H04N 19/107* (2014.01)
*H04N 19/122* (2014.01)

(56) References Cited

U.S. PATENT DOCUMENTS

| | | | | |
|---|---|---|---|---|
| 2018/0020218 | A1* | 1/2018 | Zhao | H04N 19/12 |
| 2018/0103252 | A1* | 4/2018 | Hsieh | H04N 19/176 |
| 2019/0306522 | A1* | 10/2019 | Said | H04N 19/12 |
| 2019/0306536 | A1* | 10/2019 | Lim | H04N 19/149 |
| 2019/0356915 | A1* | 11/2019 | Jang | H04N 19/176 |
| 2020/0053365 | A1* | 2/2020 | Aono | H04N 19/12 |
| 2020/0137422 | A1* | 4/2020 | Misra | H04N 19/132 |
| 2020/0213587 | A1* | 7/2020 | Galpin | G06N 3/08 |

OTHER PUBLICATIONS

Benjamin Bross et al., "Versatile Video Coding (Draft 2)", Joint Video Experts Team (JVET) of ITU-T SG 16 WP 3 and ISO/IEC JTC 1/SC 29/WG 11, JVTEK-K1001 v7, 11$^{th}$ Meeting: Ljubljana, SI, Jul. 10-18, 2018, 140 pages.

* cited by examiner 210
240
230
250
Network
220

Decoder 310
Channel 412
Receiver 410
Buffer Memory 415
Parser 420
Symbols 421
Scaler / Inverse Transform 451
Loop Filter 454
455
Display 212
Motion Comp. Prediction 453
Intra Prediction 452
Current Picture 456
Reference Picture Buffer 457

Encoder 303
Source 301
Source Video Sequence
Controller 550
Source Coder 530
Coding Engine 532
Predictor 535
Reference picture memory 534
Decoder 533
Entropy Coder 545
543
Transmitter 540
Channel 560

600
Start
Determining whether small transform size is to be used for residual coding
610
Yes
No
Identifying, as primary transform, first transform set including DST-4 and DCT-4
620
Identifying, as primary transform, second transform set including DST-7 and DCT-8
630
Performing residual coding of coded block, using identified primary transform
640
End

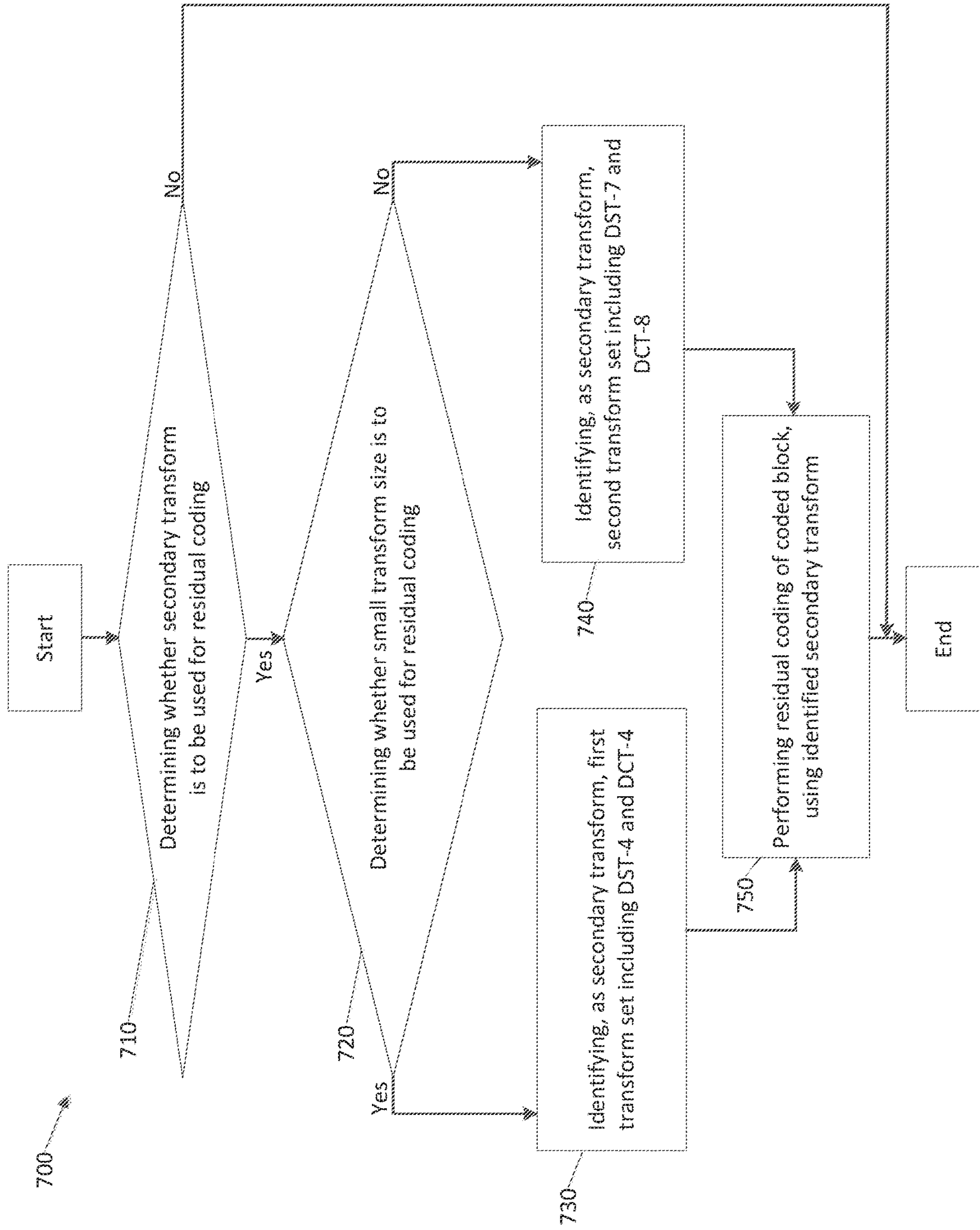
FIG. 7
700
Start
710
Determining whether secondary transform is to be used for residual coding
Yes
No
720
Determining whether small transform size is to be used for residual coding
Yes
No
730
Identifying, as secondary transform, first transform set including DST-4 and DCT-4
740
Identifying, as secondary transform, second transform set including DST-7 and DCT-8
750
Performing residual coding of coded block, using identified secondary transform
End Computer System 900
949
CPU
941
GPU
942
FPGA
943
Accl.
944
System Bus 1248
901
903
902
905
906
908
907
Graphics
Adapter
950
946
945
947
940
949
909
910
921
920
922
923
Network
Interface
954
955

METHOD AND APPARATUS FOR IMPROVED COMPOUND ORTHONORMAL TRANSFORM

CROSS-REFERENCE TO RELATED APPLICATION

This application is a Continuation Application of U.S. application Ser. No. 16/381,470, filed on Apr. 11, 2019, which claims priority from U.S. Provisional Patent Application No. 62/712,818, filed on Jul. 31, 2018, in the United States Patent and Trademark Office, which is incorporated herein by reference in its entirety.

BACKGROUND

1. Field

Methods and apparatuses consistent with embodiments relate to video coding, and more particularly, a method and an apparatus for an improved compound orthonormal transform.

2. Description of Related Art

In High Efficiency Video Coding (HEVC), core transforms are 4-point, 8-point, 16-point and 32-point discrete cosine transform (DCT)-2. Transform core matrices of a smaller DCT-2 are part of a larger DCT-2, as shown below.

```
4x4 transform
{64, 64, 64, 64}
{83, 36, −36, −83}
{64, −64, −64, 64}
{36, −83, 83, −36}
8x8 transform
{64, 64, 64, 64, 64, 64, 64, 64}
{89, 75, 50, 18, −18, −50, −75, −89}
{83, 36, −36, −83, −83, −36, 36, 83}
{75, −18, −89, −50, 50, 89, 18, −75}
{64, −64, −64, 64, 64, −64, −64, 64}
{50, −89, 18, 75, −75, −18, 89, −50}
{36, −83, 83, −36, −36, 83, −83, 36}
{18, −50, 75, −89, 89, −75, 50, −18}
16x16 transform
{64 64 64 64 64 64 64 64 64 64 64 64 64 64 64 64}
{90 87 80 70 57 43 25 9 −9−25−43−57−70−80−87−90}
{89 75 50 18−18−50−75−89−89−75−50−18 18 50 75 89}
{87 57 9−43−80−90−70−25 25 70 90 80 43 −9−57−87}
{83 36−36−83−83−36 36 83 83 36−36−83−83−36 36 83}
{80 9−70−87−25 57 90 43−43−90−57 25 87 70 −9−80}
{75−18−89−50 50 89 18−75−75 18 89 50−50−89−18 75}
{70−43−87 9 90 25−80−57 57 80−25−90 −9 87 43−70}
{64−64−64 64 64−64−64 64 64−64−64 64 64−64−64 64}
{57−80−25 90 −9−87 43 70−70−43 87 9−90 25 80−57}
{50−89 18 75−75−18 89−50−50 89−18−75 75 18−89 50}
{43−90 57 25−87 70 9−80 80 −9−70 87−25−57 90−43}
{36−83 83−36−36 83−83 36 36−83 83−36−36 83−83 36}
{25−70 90−80 43 9−57 87−87 57 −9−43 80−90 70−25}
{18−50 75−89 89−75 50−18−18 50−75 89−89 75−50 18}
{9−25 43−57 70−80 87−90 90−87 80−70 57−43 25 −9}
32x32 transform
{64 64 64 64 64 64 64 64 64 64 64 64 64 64 64 64 64 64 64 64 64 64 64 64 64 64 64 64 64 64 64 64}
{90 90 88 85 82 78 73 67 61 54 46 38 31 22 13 4 −4−13−22−31−38−46−54−61−67−73−78−82−85−88−90−90}
{90 87 80 70 57 43 25 9 −9−25−43−57−70−80−87−90−90−87−80−70−57−43−25 −9 9 25 43 57 70 80 87 90}
{90 82 67 46 22 −4−31−54−73−85−90−88−78−61−38−13 13 38 61 78 88 90 85 73 54 31 4−22−46−67−82−90}
{89 75 50 18−18−50−75−89−89−75−50−18 18 50 75 89 89 75 50 18−18−50−75−89−89−75−50−18 18 50 75 89}
{88 67 31−13−54−82−90−78−46 −4 38 73 90 85 61 22−22−61−85−90−73−38 4 46 78 90 82 54 13−31−67−88}
{87 57 9−43−80−90−70−25 25 70 90 80 43 −9−57−87−87−57 −9 43 80 90 70 25−25−70−90−80−43 9 57 87}
{85 46−13−67−90−73−22 38 82 88 54 −4−61−90−78−31 31 78 90 61 4−54−88−82−38 22 73 90 67 13−46−85}
{83 36−36−83−83−36 36 83 83 36−36−83−83−36 36 83 83 36−36−83−83−36 36 83 83 36−36−83−83−36 36 83}
{82 22−54−90−61 13 78 85 31−46−90−67 4 73 88 38−38−88−73 −4 67 90 46−31−85−78−13 61 90 54−22−82}
{80 9−70−87−25 57 90 43−43−90−57 25 87 70 −9−80−80 −9 70 87 25−57−90−43 43 90 57−25−87−70 9 80}
{78 −4−82−73 13 85 67−22−88−61 31 90 54−38−90−46 46 90 38−54−90−31 61 88 22−67−85−13 73 82 4−78}
{75−18−89−50 50 89 18−75−75 18 89 50−50−89−18 75 75−18−89−50 50 89 18−75−75 18 89 50−50−89−18 75}
{73−31−90−22 78 67−38−90−13 82 61−46−88 −4 85 54−54−85 4 88 46−61−82 13 90 38−67−78 22 90 31−73}
{70−43−87 9 90 25−80−57 57 80−25−90 −9 87 43−70−70 43 87 −9−90−25 80 57−57−80 25 90 9−87−43 70}
{67−54−78 38 85−22−90 4 90 13−88−31 82 46−73−61 61 73−46−82 31 88−13−90 −4 90 22−85−38 78 54−67}
{64−64−64 64 64−64−64 64 64−64−64 64 64−64−64 64 64−64−64 64 64−64−64 64 64−64−64 64 64−64−64 64}
{61−73−46 82 31−88−13 90 −4−90 22 85−38−78 54 67−67−54 78 38−85−22 90 4−90 13 88−31−82 46 73−61}
{57−80−25 90 −9−87 43 70−70−43 87 9−90 25 80−57−57 80 25−90 9 87−43−70 70 43−87 −9 90−25−80 57}
{54−85 −4 88−46−61 82 13−90 38 67−78−22 90−31−73 73 31−90 22 78−67−38 90−13−82 61 46−88 4 85−54}
{50−89 18 75−75−18 89−50−50 89−18−75 75 18−89 50 50−89 18 75−75−18 89−50−50 89−18−75 75 18−89 50}
```

-continued

```
{46–90 38 54–90 31 61–88 22 67–85 13 73–82 4 78–78 –4 82–73–13 85–67–22 88–61–31 90–54–38 90–46}
{43–90 57 25–87 70 9–80 80 –9–70 87–25–57 90–43–43 90–57–25 87–70 –9 80–80 9 70–87 25 57–90 43}
{38–88 73 –4–67 90–46–31 85–78 13 61–90 54 22–82 82–22–54 90–61–13 78–85 31 46–90 67 4–73 88–38}
{36–83 83–36–36 83–83 36 36–83 83–36–36 83–83 36 36–83 83–36–36 83–83 36 36–83 83–36–36 83–83 36}
{31–78 90–61 4 54–88 82–38–22 73–90 67–13–46 85–85 46 13–67 90–73 22 38–82 88–54 –4 61–90 78–31}
{25–70 90–80 43 9–57 87–87 57 –9–43 80–90 70–25–25 70–90 80–43 –9 57–87 87–57 9 43–80 90–70 25}
{22–61 85–90 73–38 –4 46–78 90–82 54–13–31 67–88 88–67 31 13–54 82–90 78–46 4 38–73 90–85 61–22}
{18–50 75–89 89–75 50–18–18 50–75 89–89 75–50 18 18–50 75–89 89–75 50–18–18 50–75 89–89 75–50 18}
{13–38 61–78 88–90 85–73 54–31 4 22–46 67–82 90–90 82–67 46–22 –4 31–54 73–85 90–88 78–61 38–13}
{9–25 43–57 70–80 87–90 90–87 80–70 57–43 25 –9 –9 25–43 57–70 80–87 90–90 87–80 70–57 43–25 9}
{4–13 22–31 38–46 54–61 67–73 78–82 85–88 90–90 90–90 88–85 82–78 73–67 61–54 46–38 31–22 13 –4}
```

DCT-2 cores show symmetry/anti-symmetry characteristics, as listed below:

Feature #1: Even rows with index 0,2,4, . . . are symmetric with a symmetry point before coefficient no. N/2.

Feature #2: Odd rows with index 1,3,5,7, . . . are anti-symmetric with a symmetry point before coefficient no. N/2.

In addition, an N-point DCT-2 core (denoted by TN) is part of a 2N-point DCT-2 (denoted by T2N):

Feature #3: $TN_{x,y}=T2N_{x,2y}$, where x, y=0, 1, . . . , N-1.

Based on the above symmetry/anti-symmetry characteristics (Feature #1 and Feature #2) and a relationship between the N-point DCT-2 and the 2N-point DCT-2 (Feature #3), a so-called "partial butterfly" implementation is supported to reduce a number of operation counts (multiplications, adds/subs, shifts), and identical results of matrix multiplication can be obtained using the partial butterfly.

If each of transform bases is either symmetric or anti-symmetric, and an N-point transform is part of a 2N-point transform, it is called a "recursive transform." Examples of recursive transforms include DCT-2, Hadamard transform, DCT-1, discrete sine transform (DST)-1 and DST-2. Reordering transform bases of one recursive transform results in another recursive transform.

In addition to DCT-2 and 4×4 DST-7, which have been employed in HEVC, an Adaptive Multiple Transform (AMT), or as known as an Enhanced Multiple Transform (EMT) or a Multiple Transform Selection (MTS), has been proposed for residual coding for both inter and intra coded blocks. The AMT uses multiple selected transforms from DCT/DST families other than current transforms in HEVC. Newly introduced transform matrices are DST-7, DCT-8, DST-1 and DCT-5. Table 1 shows basis functions of a selected DST/DCT.

TABLE 1

Transform basis functions of DCT-2/4/5/8 and DST-1/4/7 for N-point input

| Transform Type | Basis function $T_i(j)$, i, j = 0, . . . , N − 1 |
|---|---|
| DCT-2 | $T_i(j)=\omega_0\cdot\sqrt{\frac{2}{N}}\cdot\cos\left(\frac{\pi\cdot i\cdot(2j+1)}{2N}\right)$ where $\omega_0=\begin{cases}\sqrt{\frac{2}{N}} & i=0\\ 1 & i\neq 0\end{cases}$ |
| DCT-4 | $T_i(j)=\sqrt{\frac{2}{N}}\cdot\cos\left(\frac{\pi\cdot(2i+1)\cdot(2j+1)}{2N}\right)$ |
| DCT-5 | $T_i(j)=\omega_0\cdot\omega_1\cdot\sqrt{\frac{2}{2N-1}}\cdot\cos\left(\frac{2\pi\cdot i\cdot j}{2N-1}\right)$, where $\omega_0=\begin{cases}\sqrt{\frac{2}{N}} & i=0\\ 1 & i\neq 0\end{cases}$, $\omega_1=\begin{cases}\sqrt{\frac{2}{N}} & j=0\\ 1 & j\neq 0\end{cases}$ |
| DCT-8 | $T_i(j)=\sqrt{\frac{4}{2N+1}}\cdot\cos\left(\frac{\pi\cdot(2i+1)\cdot(2j+1)}{4N+2}\right)$ |
| DST-1 | $T_i(j)=\sqrt{\frac{2}{N+1}}\cdot\sin\left(\frac{\pi\cdot(i+1)\cdot(j+1)}{N+1}\right)$ |
| DST-4 | $T_i(j)=\sqrt{\frac{2}{N}}\cdot\sin\left(\frac{\pi\cdot(2i+1)\cdot(2j+1)}{2N}\right)$ |
| DST-7 | $T_i(j)=\sqrt{\frac{4}{2N+1}}\cdot\sin\left(\frac{\pi\cdot(2i+1)\cdot(j+1)}{2N+1}\right)$ |

To keep the orthogonality of a transform matrix, transform matrices are quantized more accurately than transform matrices in HEVC, with a 10-bit representation instead of an 8-bit representation in HEVC. To keep intermediate values of transformed coefficients within a range of 16-bit, after a horizontal transform and after a vertical transform, all the coefficients are right shifted by 2 more bits, comparing to a right shift used in current HEVC transforms.

The AMT applies to coding units (CUs) with both a width and a height smaller than or equal to 64, and whether the AMT applies or not is controlled by a CU level flag. When the CU level flag is equal to 0, a DCT-2 is applied in the CU to encode a residue. For a luma coding block within an AMT-enabled CU, two additional flags are signaled to identify horizontal and vertical transforms to be used.

For intra residue coding, due to different residual statistics of different intra prediction modes, a mode-dependent transform candidate selection process is used. Three transform subsets are defined as shown in Table 2, and a transform subset is selected based on an intra prediction mode, as specified in Table 3.

TABLE 2

Three pre-defined transform candidate sets

| Transform Set | Transform Candidates |
|---|---|
| 0 | DST-7 DCT-8 |
| 1 | DST-7, DST-1 |
| 2 | DST-7, DCT-5 |

TABLE 3

Selected (H)orizontal and (V)ertical transform sets for each intra prediction mode

| Intra Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| V | 2 | 1 | 0 | 1 | 0 | 1 | 0 | 1 | 0 | 1 | 0 | 1 | 0 | 1 | 0 | 0 | 0 | 0 |
| H | 2 | 1 | 0 | 1 | 0 | 1 | 0 | 1 | 0 | 1 | 0 | 1 | 0 | 1 | 2 | 2 | 2 | 2 |

| Intra Mode | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| V | 0 | 0 | 0 | 0 | 0 | 1 | 0 | 1 | 0 | 1 | 0 | 1 | 0 | 1 | 0 | 1 | 0 |
| H | 2 | 2 | 2 | 2 | 2 | 1 | 0 | 1 | 0 | 1 | 0 | 1 | 0 | 1 | 0 | 1 | 0 |

| Intra Mode | 35 | 36 | 37 | 38 | 39 | 40 | 41 | 42 | 43 | 44 | 45 | 46 | 47 | 48 | 49 | 50 | 51 | 52 |
|---|---|---|---|---|---|---|---|---|---|---|---|---|---|---|---|---|---|---|
| V | 1 | 0 | 1 | 0 | 1 | 0 | 1 | 0 | 1 | 0 | 1 | 2 | 2 | 2 | 2 | 2 | 2 | 2 |
| H | 1 | 0 | 1 | 0 | 1 | 0 | 1 | 0 | 1 | 0 | 1 | 0 | 0 | 0 | 0 | 0 | 0 | 0 |

| Intra Mode | 53 | 54 | 55 | 56 | 57 | 58 | 59 | 60 | 61 | 62 | 63 | 64 | 65 | 66 |
|---|---|---|---|---|---|---|---|---|---|---|---|---|---|---|
| V | 2 | 2 | 1 | 0 | 1 | 0 | 1 | 0 | 1 | 0 | 1 | 0 | 1 | 0 |
| H | 0 | 0 | 1 | 0 | 1 | 0 | 1 | 0 | 1 | 0 | 1 | 0 | 1 | 0 |

With a subset concept, a transform subset is first identified based on Table 3, using an intra prediction mode of a CU with a CU-level AMT flag being equal to 1. After that, for each of horizontal and vertical transforms, one of two transform candidates in the identified transform subset, according to Table 2, is selected based on explicitly-signaled flags.

For inter prediction residual, however, only one transform set, which consists of DST-7 and DCT-8, is used for all inter modes and for both horizontal and vertical transforms.

Among four additional transform types, i.e., DST-7, DCT-8, DST-1 and DCT-5, the most efficiently used transform types are DST-7 and DCT-8. It is noted that DCT-8 is essentially flipping a DST-7 basis left and right with sign changes, so DCT-8 and DST-7 are basically sharing the same transform bases.

A transform core, which is a matrix composed by basis vectors, of DST-7 can be also represented below:

4-point DST-7

| | | | |
|---|---|---|---|
| a, | b, | c, | d |
| c, | c, | 0, | −c |
| d, | −a, | −c, | b |
| b, | −d, | c, | −a |

8-point DST-7

| | | | | | | | |
|---|---|---|---|---|---|---|---|
| a, | b, | c, | d, | e, | f, | g, | h |
| c, | f, | h, | e, | b, | −a, | −d, | −g |
| e, | g, | b, | −c, | −h, | −d, | a, | f |
| g, | c, | −d, | −f, | a, | h, | b, | −e |
| h, | −a, | −g, | b, | f, | −c, | −e, | d |
| f, | −e, | −a, | g, | −d, | −b, | h, | −c |
| d, | −h, | e, | −a, | −c, | g, | −f, | b |
| b, | −d, | f, | −h, | g, | −e, | c, | −a |

16-point DST-7

| | | | | | | | | | | | | | | | |
|---|---|---|---|---|---|---|---|---|---|---|---|---|---|---|---|
| a, | b, | c, | d, | e, | f, | g, | h, | i, | j, | k, | l, | m, | n, | o, | p |
| c, | f, | i, | l, | o, | o, | l, | i, | f, | c, | 0, | −c, | −f, | −i, | −l, | −o |
| e, | j, | o, | m, | h, | c, | −b, | −g, | −l, | −p, | −k, | −f, | −a, | d, | i, | n |
| g, | n, | l, | e, | −b, | −i, | −p, | −j, | −c, | d, | k, | o, | h, | a, | −f, | −m |
| i, | o, | f, | −c, | −l, | −l, | −c, | f, | o, | i, | 0, | −i, | −o, | −f, | c, | l |
| k, | k, | 0, | −k, | −k, | 0, | k, | k, | 0, | −k, | −k, | 0, | k, | k, | 0, | −k |
| m, | g, | −f, | −n, | −a, | l, | h, | −e, | −o, | −b, | k, | i, | −d, | −p, | −c, | j |
| o, | c, | −l, | −f, | i, | i, | −f, | −l, | c, | o, | 0, | −o, | −c, | l, | f, | −i |
| p, | −a, | −o, | b, | n, | −c, | −m, | d, | l, | −e, | −k, | f, | j, | −g, | −i, | h |
| n, | −e, | −i, | j, | d, | −o, | a, | m, | −f, | −h, | k, | c, | −p, | b, | l, | −g |
| l, | −i, | −c, | o, | −f, | −f, | o, | −c, | −i, | l, | 0, | −l, | i, | c, | −o, | f |
| j, | −m, | c, | g, | −p, | f, | d, | −n, | i, | a, | −k, | l, | −b, | −h, | o, | −e |
| h, | −p, | i, | −a, | −g, | o, | −j, | b, | f, | −n, | k, | −c, | −e, | m, | −l, | d |
| f, | −l, | o, | −i, | c, | c, | −i, | o, | −l, | f, | 0, | −f, | l, | −o, | i, | −c |
| d, | −h, | l, | −p, | m, | −i, | e, | −a, | −c, | g, | −k, | o, | −n, | j, | −f, | b |
| b, | −d, | f, | −h, | j, | −l, | n, | −p, | o, | −m, | k, | −i, | g, | −e, | c, | −a |

32-point DST-7

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| a, | b, | c, | d, | e, | f, | g, | h, | i, | j, | k, | l, | m, | n, | o, | p, | q, | r, | s, | t, | u, | v, | w, | x, | y, | z, | A, | B, | C, | D, | E, | F |
| c, | f, | i, | l, | o, | r, | u, | x, | A, | D, | F, | C, | z, | w, | t, | q, | n, | k, | h, | e, | b, | −a, | −d, | −g, | −j, | −m, | −p, | −s, | −v, | −y, | −B, | −E |
| e, | j, | o, | t, | y, | D, | D, | y, | t, | o, | j, | e, | 0, | −e, | −j, | −o, | −t, | −y, | −D, | −D, | −y, | −t, | −o, | −j, | −e, | 0, | e, | j, | o, | t, | y, | D |
| g, | n, | u, | B, | D, | w, | p, | i, | b, | −e, | −l, | −s, | −z, | −F, | −y, | −r, | −k, | −d, | c, | j, | q, | x, | E, | A, | t, | m, | f, | −a, | −h, | −o, | −v, | −C |
| i, | r, | A, | C, | t, | k, | b, | −g, | −p, | −y, | −E, | −v, | −m, | −d, | e, | n, | w, | F, | x, | o, | f, | −c, | −l, | −u, | −D, | −z, | −q, | −h, | a, | j, | s, | E |
| k, | v, | F, | u, | j, | −a, | −l, | −w, | −E, | −t, | −i, | b, | m, | x, | D, | s, | h, | −c, | −n, | −y, | −C, | −r, | −g, | d, | o, | z, | B, | q, | f, | −e, | −p, | −A |
| m, | z, | z, | m, | 0, | −m, | −z, | −z, | −m, | 0, | m, | z, | z, | m, | 0, | −m, | −z, | −z, | −m, | 0, | −m, | z, | −z, | m, | 0, | −m, | −z, | −z, | −m, | 0, | m, | z |
| o, | D, | t, | e, | −j, | −y, | −y, | −j, | e, | t, | D, | o, | 0, | −o, | −D, | −t, | −e, | j, | y, | y, | j, | −e, | −t, | −D, | −o, | 0, | o, | D, | t, | e, | −j, | −y |
| g, | E, | n, | −c, | −t, | −B, | −k, | f, | w, | y, | h, | −i, | −z, | −v, | −e, | i, | C, | s, | b, | −o, | −F, | −p, | a, | r, | D, | m, | −d, | −u, | −A, | −j, | g, | x |
| s, | A, | h, | −k, | −D, | −p, | c, | v, | x, | e, | −n, | −F, | −m, | f, | y, | u, | b, | −q, | −C, | −j, | i, | B, | r, | −a, | −t, | −z, | −g, | l, | E, | o, | −d, | −w |
| u, | w, | b, | −s, | −y, | −d, | q, | A, | f, | −o, | −C, | −h, | m, | E, | j, | −k, | −F, | −l, | i, | D, | n, | −g, | −B, | −p, | e, | z, | r, | −c, | −x, | −t, | a, | v |
| w, | s, | −d, | −A, | −o, | h, | E, | k, | −l, | −D, | −g, | p, | z, | c, | −t, | −v, | a, | x, | r, | −e, | −B, | −n, | i, | F, | j, | −m, | −C, | −f, | g, | y, | b, | −u |
| y, | o, | −j, | −D, | −e, | t, | t, | −e, | −D, | −j, | o, | y, | 0, | −y, | −o, | j, | D, | e, | −t, | −t, | e, | D, | j, | −o, | −y, | 0, | y, | o, | −j, | −D, | −e, | t |
| A, | k, | −p, | −v, | e, | F, | f, | −u, | −q, | j, | B, | a, | −z, | −l, | o, | w, | −d, | −E, | −g, | t, | r, | −i, | −C, | −b, | y, | m, | −n, | −x, | c, | D, | h, | −s |
| C, | g, | −v, | −n, | o, | u, | −h, | −B, | a, | D, | f, | −w, | −m, | p, | t, | −i, | −A, | b, | E, | e, | −x, | −l, | q, | s, | −j, | −z, | c, | F, | d, | −y, | −k, | r |
| E, | c, | −B, | −f, | y, | i, | −v, | −l, | s, | o, | −p, | −r, | m, | u, | −j, | −x, | g, | A, | −d, | −D, | a, | F, | b, | −C, | −e, | z, | h, | −w, | −k, | t, | n, | −q |

-continued

| F, | −a, | −E, | b, | D, | −c, | −C, | d, | B, | −e, | −A, | f, | z, | −g, | −y, | h, | x, | −i, | −w, | j, | v, | −k, | −u, | l, | t, | −m, | −s, | n, | r, | −o, | −q, | p |
|---|---|---|---|---|---|---|---|---|---|---|---|---|---|---|---|---|---|---|---|---|---|---|---|---|---|---|---|---|---|---|---|
| D, | −e, | −y, | j, | t, | −o, | −o, | t, | j, | −y, | −e, | D, | 0, | −D, | e, | y, | −j, | −t, | o, | o, | −t, | −j, | y, | e, | −D, | 0, | D, | −e, | −y, | j, | t, | −o |
| B, | −i, | −s, | r, | j, | −A, | −a, | C, | −h, | −t, | q, | k, | −z, | −b, | D, | −g, | −u, | p, | l, | −y, | −c, | E, | −f, | −v, | o, | m, | −x, | −d, | F, | −e, | −w, | n |
| z, | −m, | −m, | z, | 0, | −z, | m, | m, | −z, | 0, | z, | −m, | −m, | z, | 0, | −z, | m, | m, | −z, | 0, | z, | −m, | −m, | z, | 0, | −z, | m, | m, | −z, | 0, | z, | −m |
| x, | −q, | −g, | E, | −j, | −n, | A, | −c, | −u, | t, | d, | −B, | m, | k, | −D, | f, | r, | −w, | −a, | y, | −p, | −h, | F, | −i, | −o, | z, | −b, | −v, | s, | e, | −C, | l |
| v, | −u, | −a, | w, | −t, | −b, | x, | −s, | −c, | y, | −r, | −d, | z, | −q, | −e, | A, | −p, | −f, | B, | −o, | −g, | C, | −n, | −h, | D, | −m, | −i, | E, | −l, | −j, | F, | −k, |
| t, | −y, | e, | o, | −D, | j, | j, | −D, | o, | e, | −y, | t, | 0, | −t, | y, | −e, | −o, | D, | −j, | −j, | D, | −o, | −e, | y, | −t, | 0, | t, | −y, | e, | o, | −D, | j |
| r, | −C, | k, | g, | −y, | v, | −d, | −n, | F, | −o, | −c, | u, | −z, | h, | j, | −B, | s, | −a, | −q, | D, | −l, | −f, | x, | −w, | e, | m, | −E, | p, | b, | −t, | A, | −i, |
| p, | −F, | q, | −a, | −o, | E, | −r, | b, | n, | −D, | s, | −c, | −m, | C, | −t, | d, | l, | −B, | u, | −e, | −k, | A, | −v, | f, | j, | −z, | w, | −g, | −i, | y, | −x, | h |
| n, | −B, | w, | −i, | −e, | s, | −F, | r, | −d, | −j, | x, | −A, | m, | a, | −o, | C, | −v, | h, | f, | −t, | E, | −q, | c, | k, | −y, | z, | −l, | −b, | p, | −D, | u, | −q, |
| l, | −x, | C, | −q, | e, | g, | −s, | E, | −v, | j, | b, | −n, | z, | −A, | o, | −c, | −i, | u, | −F, | t, | −h, | −d, | p, | −B, | y, | −m, | a, | k, | −w, | D, | −r, | f |
| j, | −t, | D, | −y, | o, | −e, | −e, | o, | −y, | D, | −t, | j, | 0, | −j, | t, | −D, | y, | −o, | e, | e, | −o, | y, | −D, | t, | −j, | 0, | j, | −t, | D, | −y, | o, | −e, |
| h, | −p, | x, | −F, | y, | −q, | i, | −a, | −g, | o, | −w, | E, | −z, | r, | −j, | b, | f, | −n, | v, | −D, | A, | −s, | k, | −c, | −e, | m, | −u, | C, | −B, | t, | −l, | d |
| f, | −l, | r, | −x, | D, | −C, | w, | −q, | k, | −e, | −a, | g, | −m, | s, | −y, | E, | −B, | v, | −p, | j, | −d, | −b, | h, | −n, | t, | −z, | F, | −A, | u, | −o, | i, | −c, |
| d, | −h, | l, | −p, | t, | −x, | B, | −F, | C, | −y, | u, | −q, | m, | −i, | e, | −a, | −c, | g, | −k, | o, | −s, | w, | −A, | E, | −D, | z, | −v, | r, | −n, | j, | −f, | b |
| b, | −d, | f, | −h, | j, | −l, | n, | −p, | r, | −t, | v, | −x, | z, | −B, | D, | −F, | E, | −C, | A, | −y, | w, | −u, | s, | −q, | o, | −m, | k, | −i, | g, | −e, | c, | −a |

Variables a, b, c, . . . , aa, ab, ac, cl can be derived based on formulations of DST-7 shown in Table 1, and their values can be different for a different size of DST-7. For example, a value of "a" can be different for 4-point and 8-point DST-7.

To avoid floating point operations, similar to DCT-2 cores used in HEVC, a transform core of DST-7 can be scaled by a pre-defined factor, e.g., $64\cdot\sqrt{N}$ or $256\cdot\sqrt{N}$, and rounded to a nearest integer, or further tuned by an offset, e.g., +1/−1.

Different from DCT-2, of which fast methods have been extensively studied, an implementation of DST-7 is still much less efficient than DCT-2, e.g., matrix multiplication.

In some video coding standards, methods have been proposed to extract N-point DCT-4/DST-4 bases from 2N-point DCT-2 bases, and DST-7/DCT-8 is replaced by DST-4/DCT-4, respectively. In this way, there is no additional storage for transform bases used in AMT, and therefore a complexity of AMT is reduced in terms of memory cost for storing additional transform bases used in AMT.

However, it is experimentally shown that DST-7/DCT-8 shows better coding performance than DST-4/DCT-4. To keep DST-7/DCT-8, while reducing the memory cost for storing the additional transform bases used in AMT, in some video coding standards, methods have been proposed to embed N-point DST-7/DCT-8 into 2N-point DCT-2.

A mode-dependent non-separable secondary transform (NSST) has been proposed in the literature, which is applied between a forward core transform and quantization (at an encoder) and between de-quantization and an inverse core transform (at a decoder). To keep low complexity, NSST is only applied to low frequency coefficients after a primary transform. If both width (W) and height (H) of a transform coefficient block is larger than or equal to 8, then an 8×8 non-separable secondary transform is applied to a top-left 8×8 region of the transform coefficient block. Otherwise, if either W or H of a transform coefficient block is equal to 4, a 4×4 non-separable secondary transform is applied, and the 4×4 non-separable second transform is performed on a top-left min(8,W)×min(8,H) region of the transform coefficient block. The above transform selection rule is applied for both luma and chroma components.

Matrix multiplication implementation of a non-separable transform is described as follows, using a 4×4 input block as an example. To apply the non-separable transform, the 4×4 input block X in Equation (1) is represented as a vector $\vec{X}$ in Equation (2):

$$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix} \quad (1)$$

$$\vec{X} = [X_{00}\ X_{01}\ X_{02}\ X_{03}\ X_{10}\ X_{11}\ X_{12}\ X_{13}\ X_{20}\ X_{21}\ X_{22}\ X_{23}\ X_{30}\ X_{31}\ X_{32}\ X_{33}]^T \quad (2)$$

The non-separable transform is calculated as $\vec{F}=T\cdot\vec{X}$, where $\vec{F}$ indicates a transform coefficient vector, and T is a 16×16 transform matrix. The 16×1 transform coefficient vector $\vec{F}$ is subsequently re-organized as a 4×4 block, using a scanning order for that block (horizontal, vertical or diagonal). Coefficients with a smaller index will be placed with a smaller scanning index in the 4×4 coefficient block.

There is a total of 35×3 non-separable secondary transforms for both 4×4 and 8×8 block sizes, where 35 is a number of transform sets specified by an intra prediction mode, denoted as set, and 3 is a number of NSST candidates for each intra prediction mode. A mapping from an intra prediction mode to a transform set is defined in Table 4 below. The transform set applied to luma/chroma transform coefficients is specified by corresponding luma/chroma intra prediction modes, according to Table 4. For intra prediction modes larger than 34 (diagonal prediction directions), a transform coefficient block is transposed before/after a secondary transform at an encoder/decoder.

TABLE 4

Mapping from intra prediction mode to transform set index

| intra mode | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| set | 0 | 1 | 2 | 3 | 4 | 5 | 6 | 7 | 8 | 9 | 10 | 11 | 12 | 13 | 14 | 15 | 16 |
| intra mode | 34 | 35 | 36 | 37 | 38 | 39 | 40 | 41 | 42 | 43 | 44 | 45 | 46 | 47 | 48 | 49 | 50 |
| set | 34 | 33 | 32 | 31 | 30 | 29 | 28 | 27 | 26 | 25 | 24 | 23 | 22 | 21 | 20 | 19 | 18 |
| intra mode | 17 | 18 | 19 | 20 | 21 | 22 | 23 | 24 | 25 | 26 | 27 | 28 | 29 | 30 | 31 | 32 | 33 |
| set | 17 | 18 | 19 | 20 | 21 | 22 | 23 | 24 | 25 | 26 | 27 | 28 | 29 | 30 | 31 | 32 | 33 |
| intra mode | 51 | 52 | 53 | 54 | 55 | 56 | 57 | 58 | 59 | 60 | 61 | 62 | 63 | 64 | 65 | 66 | 67 (LM) |
| set | 17 | 16 | 15 | 14 | 13 | 12 | 11 | 10 | 9 | 8 | 7 | 6 | 5 | 4 | 3 | 2 | NULL |

For each transform set, a selected non-separable secondary transform candidate is further specified by an explicitly-signaled NSST index. The index is signaled in a bitstream once per intra coding block after transform coefficients and truncated unary binarization are used. A truncated value is 2 in case of planar or DC mode, and 3 for an angular intra prediction mode. This NSST index is signaled only when there is more than one non-zero coefficient in a CU. A default value is zero when it is not signaled. A zero value of this syntax element indicates a secondary transform is not applied to a current coding block, and values 1-3 indicate which secondary transform from a set should be applied.

In a benchmark set (BMS), the NSST is not applied for a block coded with a transform skip mode. When the NSST index is signaled for a coding block and not equal to zero, the NSST is not used for a block of a component that is coded with a transform skip mode in the CU. When a coding block with blocks of all components are coded in the transform skip mode or a number of non-zero coefficients of non-transform-skip mode coding blocks (CBs) is less than 2, the NSST index is not signaled for the coding block.

In some video coding standards, a coupled primary and secondary transform scheme is proposed, which couples a signaling between primary and secondary transforms. That is, an AMT and an NSST share one syntax, and an NSST transform selection is decided given a transform selection of the AMT of an intra prediction mode. Thus, no further signaling of the NSST is needed.

It is observed that a partial of odd bases (an odd basis refers to a basis vector associated with an odd index, a first basis being associated with index 0) in DCT-2 is very similar to scaled DCT-8 bases.

In FIG. 1A, second, fourth, sixth, and eighth basis vectors of a 64-point DCT-2 are shown, as indicated by solid curves. In addition, first, second, third and fourth basis vectors of a 32-point DCT-8, which is scaled by a constant $$\frac{1}{\sqrt{2}},$$

are also shown, as indicated by dotted curves. From FIG. 1A, a first half of the second, fourth, sixth, and eighth basis vectors of the 64-point DCT-2 are very close to the first, second, third and fourth basis vectors of the 32-point DCT-8 scaled by $$\frac{1}{\sqrt{2}}.$$

Based on this observation, if a first half of odd bases of a 2N-point DCT-2 is replaced with N-point scaled DCT-8 bases, and a second half is filled with flipped DCT-8 bases plus inverse signs, then a resulting basis is very close to original odd bases of the 2N-point DCT-2, as shown in FIG. 1B.

In detail, FIG. 1B shows the second, fourth, sixth, and eighth basis vectors of 64-the point DCT-2 (solid curve), the first, second, third and fourth basis vectors of the scaled 32-point DCT-8 (dash curve), and the flipped first, second, third and fourth basis vectors of the scaled 32-point DCT-8 with an inverse sign (dot-dash curve).

Therefore, a new orthonormal transform can be derived, namely, a Compound Orthonormal Transform (COT), by embedding an N-point DCT-8 (or DST-7, because DST-7 and DCT-8 bases are symmetric to each other) into a 2N-point DCT-2. The resulting transform is still an orthonormal transform due to symmetric/anti-symmetric characteristics of DCT-2, i.e., Feature #1 and Feature #2 above.

In this way, by embedding the N-point DCT-8/DST-7 into the 2N-point DCT-2, a complexity of performing an AMT is reduced in two aspects:

1. A logic of performing transform for the DCT-2 and the DCT-8/DST-7 can be shared.
2. An on-chip memory cost for storing the DCT-8 and DST-7 bases can be reduced because they are part of transform bases applied when the AMT is not selected.

SUMMARY

According to embodiments, a method of controlling residual coding for decoding or encoding of a video sequence, is performed by at least one processor and includes determining whether a small transform size of a primary transform is to be used for the residual coding of a coded block of the video sequence. The method further includes based on the small transform size of the primary transform being determined to be used, identifying, as the primary transform, a first transform set including discrete sine transform (DST)-4 and discrete cosine transform (DCT)-4, based on the small transform size of the primary transform being determined to not be used, identifying, as the primary transform, a second transform set including DST-7 and DCT-8, and performing the residual coding of the coded block, using the identified primary transform.

According to embodiments, an apparatus for controlling residual coding for decoding or encoding of a video sequence includes at least one memory configured to store computer program code, and at least one processor configured to access the at least one memory and operate according to the computer program code. The computer program code includes first determining code configured to cause the at least one processor to determine whether a small transform size of a primary transform is to be used for the residual coding of a coded block of the video sequence, identifying code configured to cause the at least one processor to, based on the small transform size of the primary transform being determined to be used, identify, as the primary transform, a first transform set including discrete sine transform (DST)-4 and discrete cosine transform (DCT)-4, and based on the small transform size of the primary transform being determined to not be used, identify, as the primary transform, a second transform set including DST-7 and DCT-8, and performing code configured to cause the at least one processor to perform the residual coding of the coded block, using the identified primary transform.

According to embodiments, a non-transitory computer-readable storage medium stores instructions that cause at least one processor to determine whether a small transform size of a primary transform is to be used for residual coding of a coded block of a video sequence, based on the small transform size of the primary transform being determined to be used, identify, as the primary transform, a first transform set including discrete sine transform (DST)-4 and discrete cosine transform (DCT)-4, based on the small transform size of the primary transform being determined to not be used, identify, as the primary transform, a second transform set including DST-7 and DCT-8, and perform the residual coding of the coded block, using the identified primary transform.

BRIEF DESCRIPTION OF THE DRAWINGS

FIG. 7 is a flowchart illustrating a method of controlling residual coding for decoding or encoding of a video sequence, according to another embodiment.

DETAILED DESCRIPTION

Figure 1A:
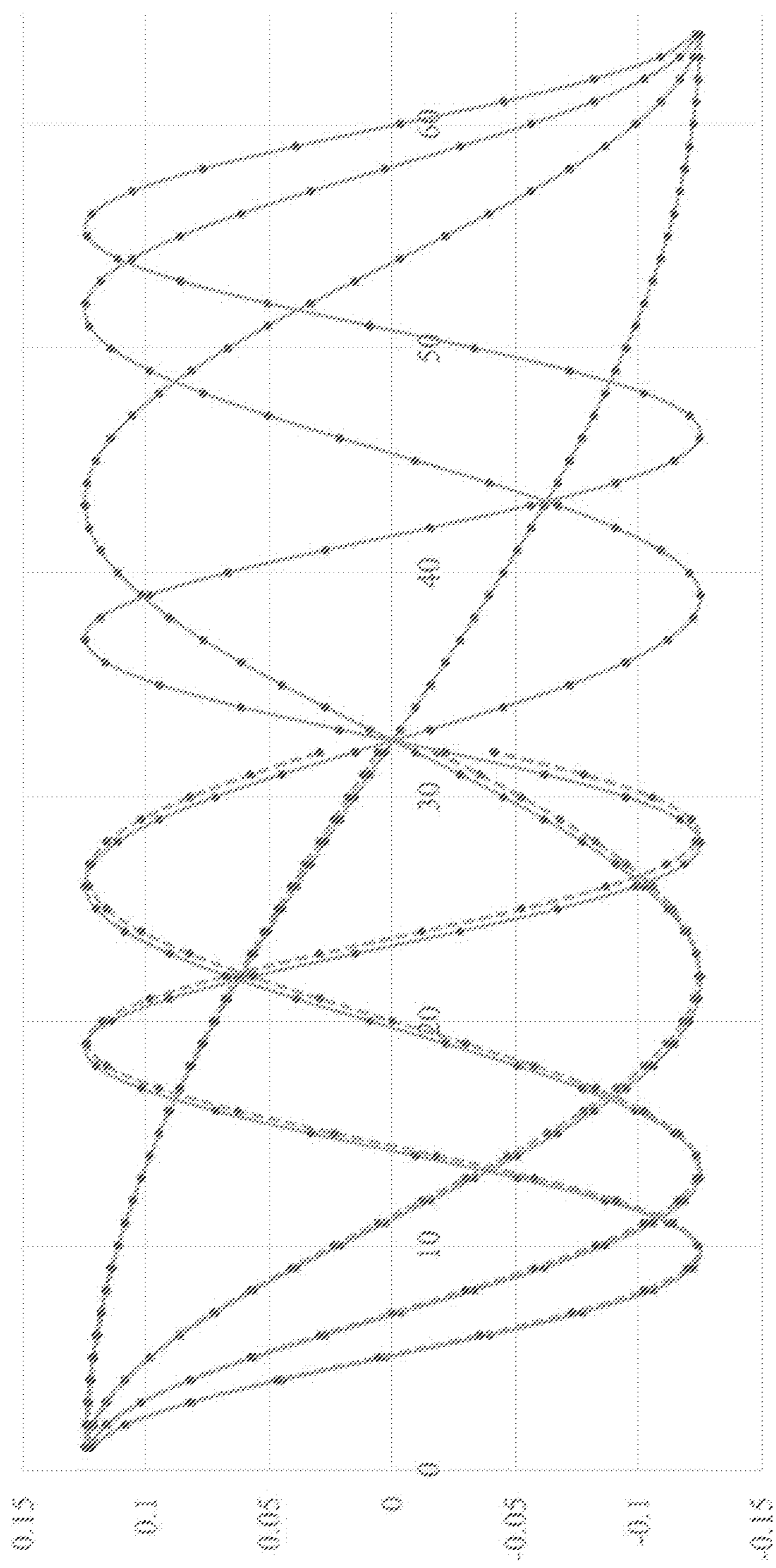
FIG. 1A is a graph of second, fourth, sixth and eight basis vectors of a 64-point DCT-2 and first, second, third and fourth basis vectors of a 32-point DCT-8.
Figure 1B:
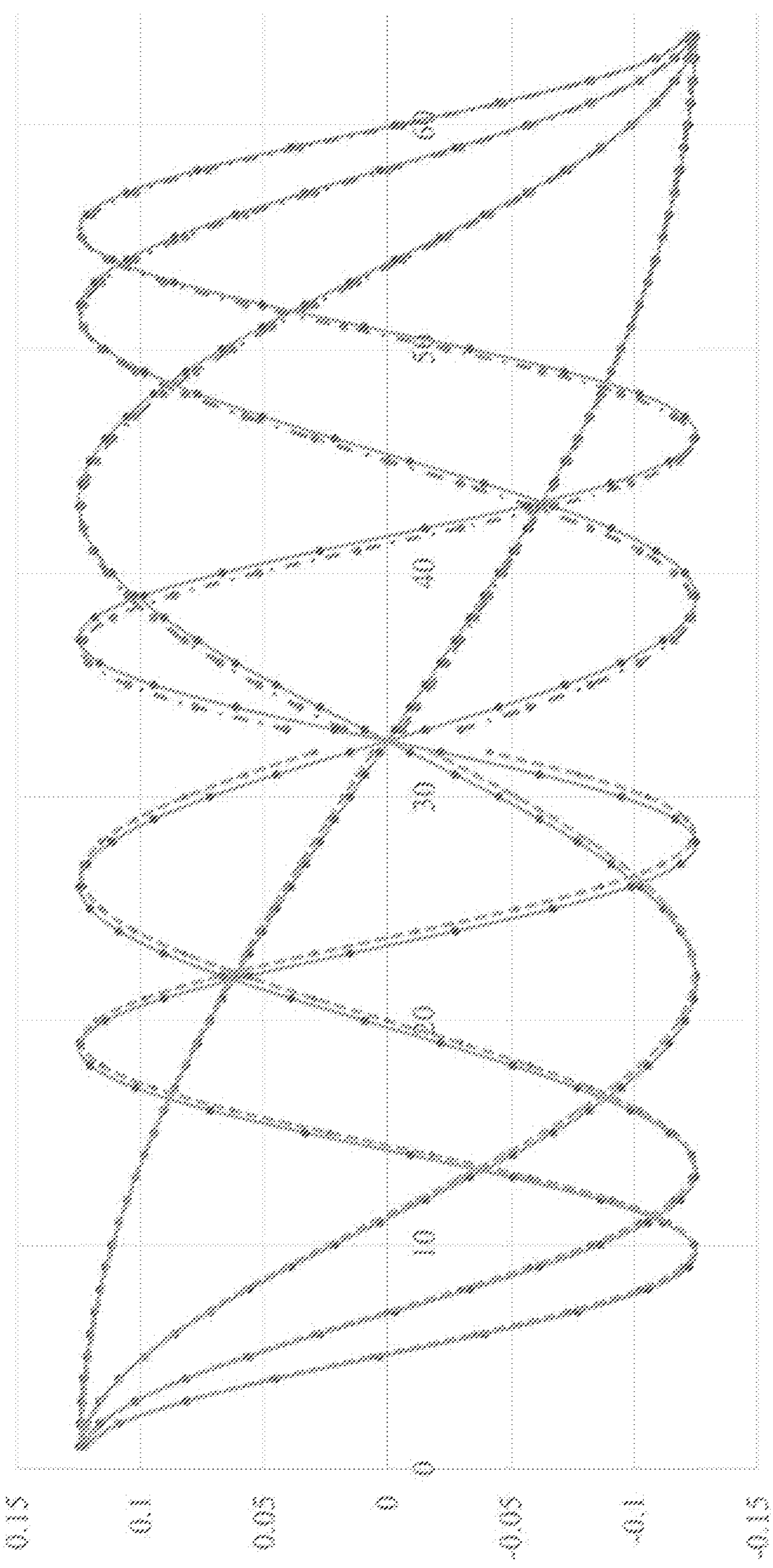
FIG. 1B is a graph of the second, fourth, sixth and eight basis vectors basis vectors of the 64-point DCT-2, the first, second, third and fourth basis vectors of the scaled 32-point DCT-8, and the flipped first, second, third and fourth basis vectors of the scaled 32-point DCT-8 with an inverse sign.
Figure 2:
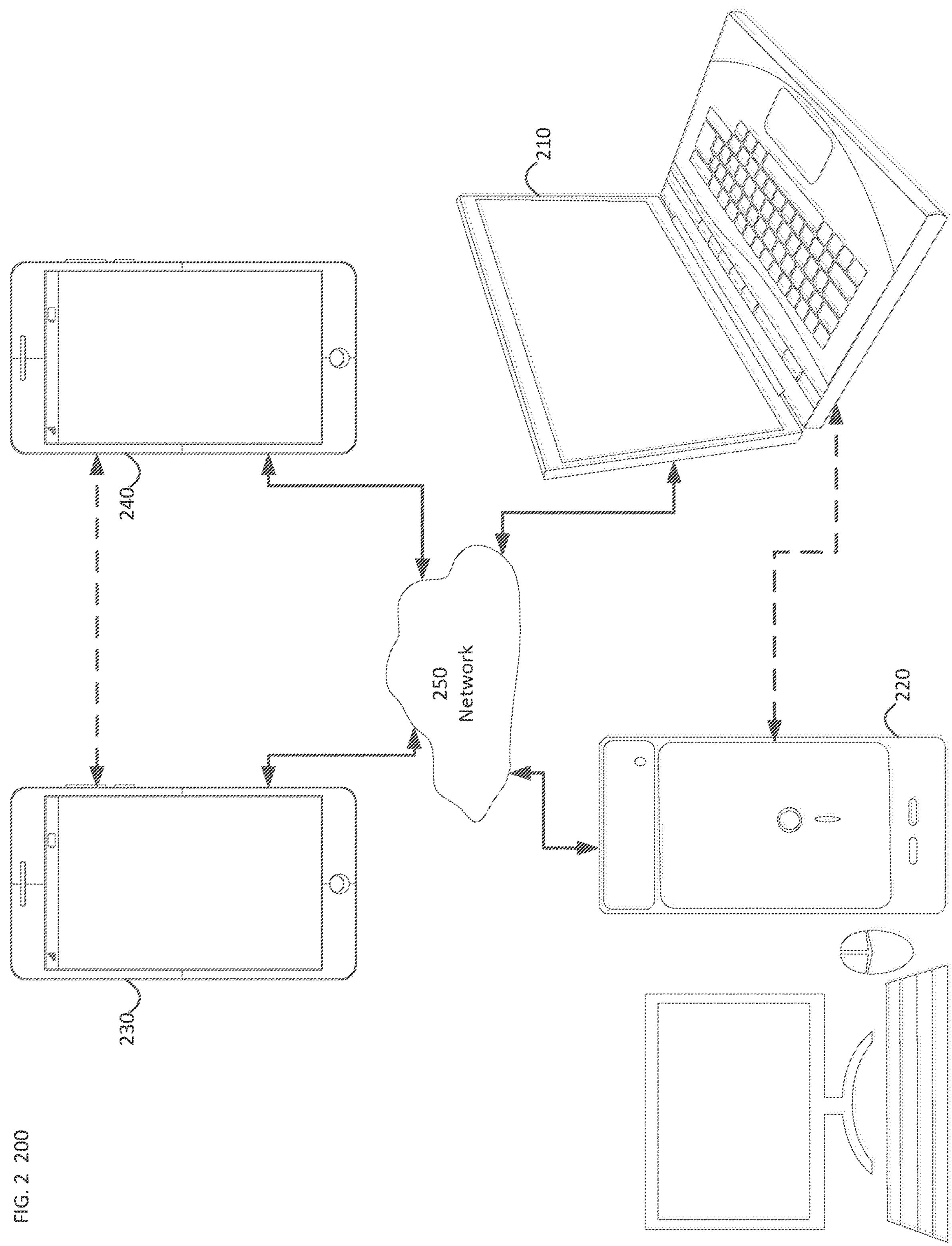
FIG. 2 is a simplified block diagram of a communication system according to an embodiment.

FIG. 2 is a simplified block diagram of a communication system (200) according to an embodiment. The communication system (200) may include at least two terminals (210-220) interconnected via a network (250). For unidirectional transmission of data, a first terminal (210) may code video data at a local location for transmission to the other terminal (220) via the network (250). The second terminal (220) may receive the coded video data of the other terminal from the network (250), decode the coded data and display the recovered video data. Unidirectional data transmission may be common in media serving applications and the like.

FIG. 2 illustrates a second pair of terminals (230, 240) provided to support bidirectional transmission of coded video that may occur, for example, during videoconferencing. For bidirectional transmission of data, each terminal (230, 240) may code video data captured at a local location for transmission to the other terminal via the network (250). Each terminal (230, 240) also may receive the coded video data transmitted by the other terminal, may decode the coded data and may display the recovered video data at a local display device.

In FIG. 2, the terminals (210-240) may be illustrated as servers, personal computers and smart phones but the principles of embodiments are not so limited. Embodiments find application with laptop computers, tablet computers, media players and/or dedicated video conferencing equipment. The network (250) represents any number of networks that convey coded video data among the terminals (210-240), including for example wireline and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of embodiments unless explained herein below.

Figure 3:
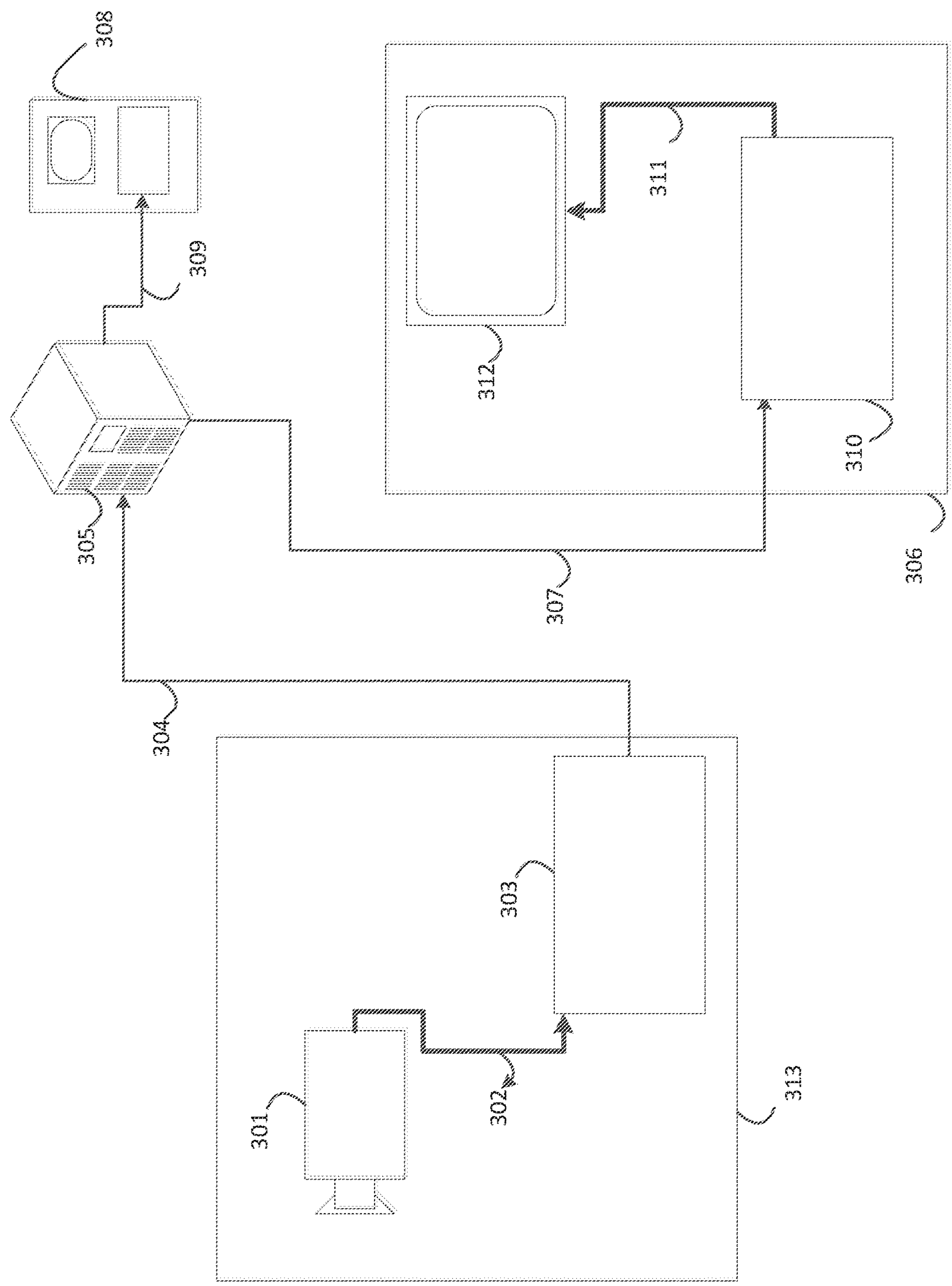
FIG. 3 is a diagram of a placement of a video encoder and a video decoder in a streaming environment, according to an embodiment.

FIG. 3 is a diagram of a placement of a video encoder and a video decoder in a streaming environment, according to an embodiment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313) that can include a video source (301), for example a digital camera, creating, for example, an uncompressed video sample stream (302). That sample stream (302), depicted as a bold line to emphasize a high data volume when compared to encoded video bitstreams, can be processed by an encoder (303) coupled to the camera (301). The encoder (303) can include hardware, software, or a combination thereof to enable or implement aspects of the disclosed subject matter as described in more detail below. The encoded video bitstream (304), depicted as a thin line to emphasize the lower data volume when compared to the sample stream, can be stored on a streaming server (305) for future use. One or more streaming clients (306, 308) can access the streaming server (305) to retrieve copies (307, 309) of the encoded video bitstream (304). A client (306) can include a video decoder (310) which decodes the incoming copy of the encoded video bitstream (307) and creates an outgoing video sample stream (311) that can be rendered on a display (312) or other rendering device (not depicted). In some streaming systems, the video bitstreams (304, 307, 309) can be encoded according to certain video coding/compression standards. Examples of those standards include ITU-T Recommendation H.265. Under development is a video coding standard informally known as VVC. The disclosed subject matter may be used in the context of VVC.

Figure 4:
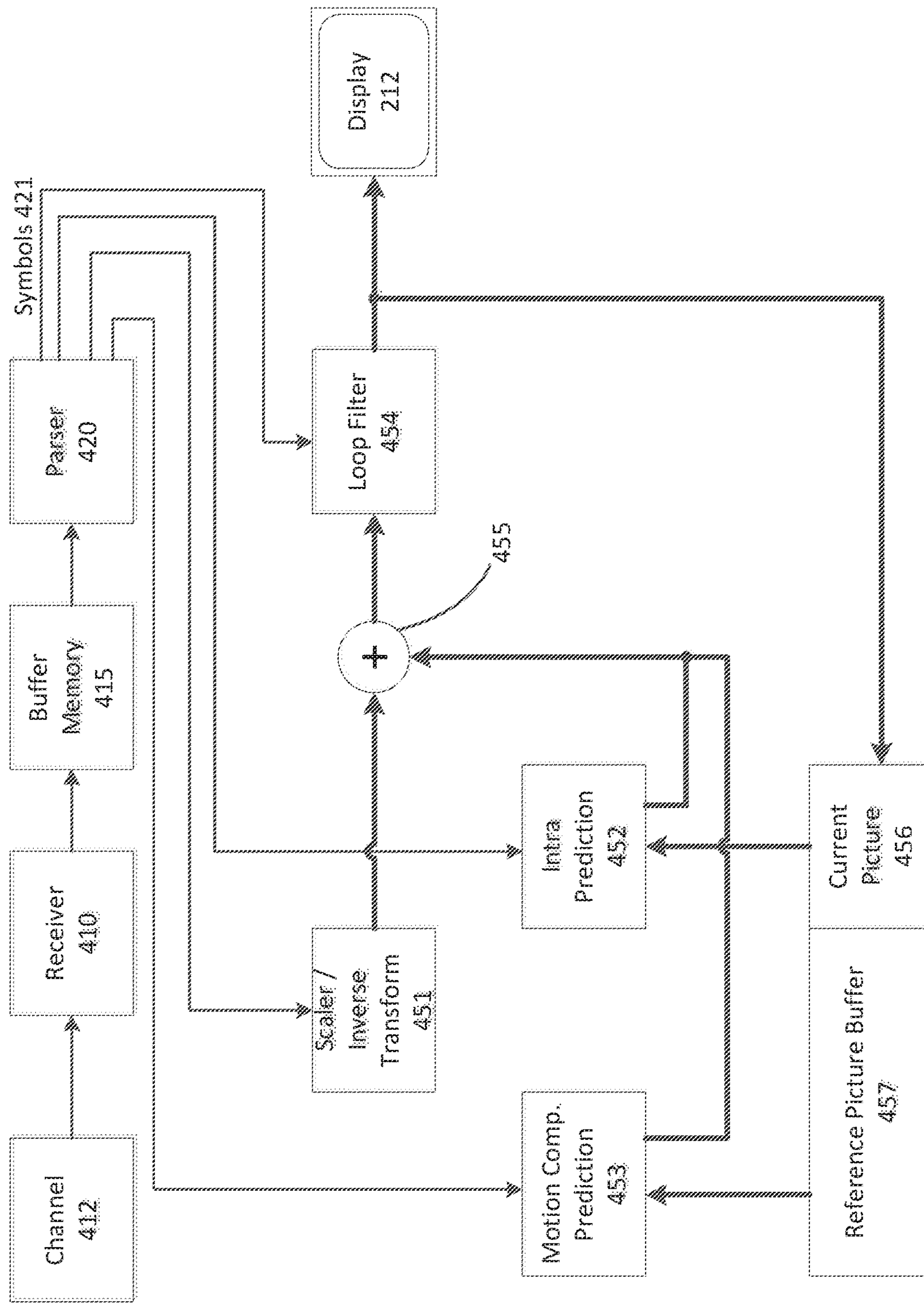
FIG. 4 is a functional block diagram of a video decoder according to an embodiment.

FIG. 4 is a functional block diagram of a video decoder (310) according to an embodiment.

A receiver (410) may receive one or more codec video sequences to be decoded by the decoder (310); in the same or an embodiment, one coded video sequence at a time, where the decoding of each coded video sequence is independent from other coded video sequences. The coded video sequence may be received from a channel (412), which may be a hardware/software link to a storage device which stores the encoded video data. The receiver (410) may receive the encoded video data with other data, for example, coded audio data and/or ancillary data streams, that may be forwarded to their respective using entities (not depicted). The receiver (410) may separate the coded video sequence from the other data. To combat network jitter, a buffer memory (415) may be coupled in between receiver (410) and entropy decoder/parser (420) ("parser" henceforth). When receiver (410) is receiving data from a store/forward device of sufficient bandwidth and controllability, or from an isosychronous network, the buffer (415) may not be needed, or can be small. For use on best effort packet networks such as the Internet, the buffer (415) may be required, can be comparatively large and can advantageously of adaptive size.

The video decoder (310) may include a parser (420) to reconstruct symbols (421) from the entropy coded video sequence. Categories of those symbols include information used to manage operation of the decoder (310), and potentially information to control a rendering device such as a display (312) that is not an integral part of the decoder but can be coupled to it, as was shown in FIG. 4. The control information for the rendering device(s) may be in the form of Supplementary Enhancement Information (SEI messages) or Video Usability Information (VUI) parameter set fragments (not depicted). The parser (420) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter (QP) values, motion vectors, and so forth.

The parser (420) may perform entropy decoding/parsing operation on the video sequence received from the buffer (415), so to create symbols (421). The parser (420) may receive encoded data, and selectively decode particular symbols (421). Further, the parser (420) may determine whether the particular symbols (421) are to be provided to a Motion Compensation Prediction unit (453), a scaler/inverse transform unit (451), an Intra Prediction unit (452), or a loop filter unit (454).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives quantized transform coefficient as well as control information, including which transform to use, block size, quantization factor, quantization scaling matrices, etc. as symbol(s) (421) from the parser (420). It can output blocks comprising sample values that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current (partly reconstructed) picture (456). The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a Motion Compensation Prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (421) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (455) can be subject to various loop filtering techniques in the loop filter unit (454). Video compression technologies can include in-loop filter technologies that are controlled by parameters included in the coded video bitstream and made available to the loop filter unit (454) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (454) can be a sample stream that can be output to the render device (312) as well as stored in the reference picture memory (456) for use in future inter-picture prediction.

Certain coded pictures, once fully reconstructed, can be used as reference pictures for future prediction. Once a coded picture is fully reconstructed and the coded picture has been identified as a reference picture (by, for example, parser (420)), the current reference picture (456) can become part of the reference picture buffer (457), and a fresh current picture memory can be reallocated before commencing the reconstruction of the following coded picture.

The video decoder (310) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (410) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 5:
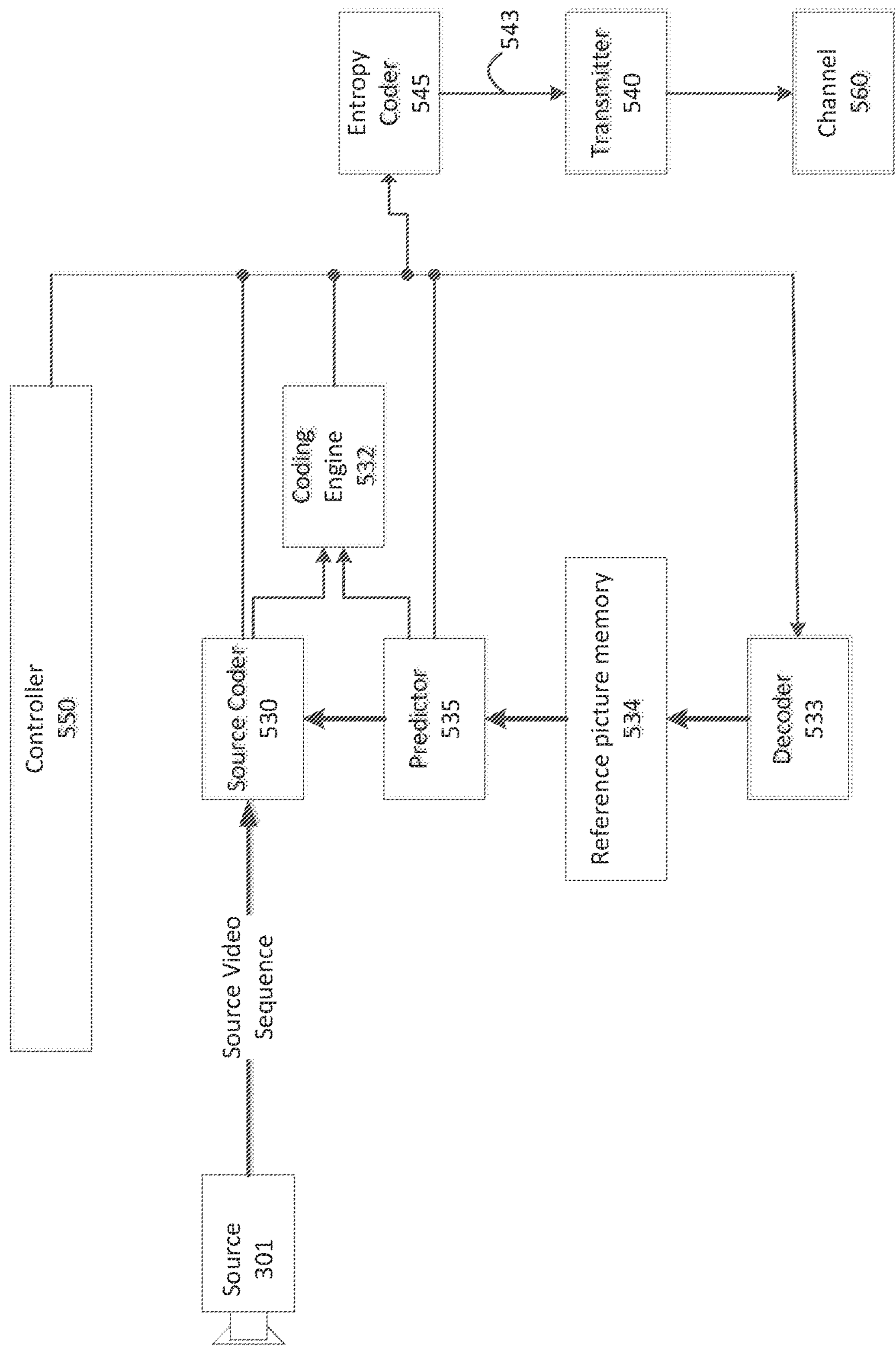
FIG. 5 is a functional block diagram of a video encoder according to an embodiment.

FIG. 5 is a functional block diagram of a video encoder (303) according to an embodiment.

The encoder (303) may receive video samples from a video source (301) (that is not part of the encoder) that may capture video image(s) to be coded by the encoder (303).

The video source (301) may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder (303) may code and compress the pictures of the source video sequence into a coded video sequence (543) in real time or under any other time constraints as required by the application. Enforcing appropriate coding speed is one function of Controller (550). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (550) as they may pertain to video encoder (303) optimized for a certain system design.

Some video encoders operate in what a person skilled in the art readily recognizes as a "coding loop." As an oversimplified description, a coding loop can consist of the encoding part of an encoder (530) ("source coder" henceforth) (responsible for creating symbols based on an input picture to be coded, and a reference picture(s)), and a (local) decoder (533) embedded in the encoder (303) that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory (534). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (533) can be the same as of a "remote" decoder (310), which has already been described in detail above in conjunction with FIG. 4. Briefly referring also to FIG. 4, however, as symbols are available and en/decoding of symbols to a coded video sequence by entropy coder (545) and parser (420) can be lossless, the entropy decoding parts of decoder (310), including channel (412), receiver (410), buffer (415), and parser (420) may not be fully implemented in local decoder (533).

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder (530) may perform motion compensated predictive coding, which codes an input frame predictively with reference to one or more previously-coded frames from the video sequence that were designated as "reference frames." In this manner, the coding engine (532) codes differences between pixel blocks of an input frame and pixel blocks of reference frame(s) that may be selected as prediction reference(s) to the input frame.

The local video decoder (533) may decode coded video data of frames that may be designated as reference frames, based on symbols created by the source coder (530). Operations of the coding engine (532) may advantageously be lossy processes. When the coded video data may be decoded at a video decoder (not shown in FIG. 4), the reconstructed video sequence typically may be a replica of the source video sequence with some errors. The local video decoder (533) replicates decoding processes that may be performed by the video decoder on reference frames and may cause reconstructed reference frames to be stored in the reference picture cache (534). In this manner, the encoder (303) may store copies of reconstructed reference frames locally that have common content as the reconstructed reference frames that will be obtained by a far-end video decoder (absent transmission errors).

The predictor (535) may perform prediction searches for the coding engine (532). That is, for a new frame to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the video coder (530), including, for example, setting of parameters and subgroup parameters used for encoding the video data.

Output of all aforementioned functional units may be subjected to entropy coding in the entropy coder (545). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (540) may buffer the coded video sequence(s) as created by the entropy coder (545) to prepare it for transmission via a communication channel (560), which may be a hardware/software link to a storage device that may store the encoded video data. The transmitter (540) may merge coded video data from the video coder (530) with other data to be transmitted, for example, coded audio data and/or ancillary data streams (sources not shown).

The controller (550) may manage operation of the encoder (303). During coding, the controller (550) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (303) may perform coding operations according to a predetermined video coding technology or standard, such as ITU-T Rec. H.265. In its operation, the video coder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The video coder (530) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

In this description, DST-4 bases and DCT-4 bases are flipped (left and right) versions of each other, plus sign changes for certain bases according to mathematical definitions of DST-4 and DCT-4. However, even if the sign changes are removed, such bases can still be called DST-4/DCT-4 because the sign changes do not have an impact on coding performance. Also, DST-7 bases and DCT-8 bases are flipped (left and right) versions of each other, plus sign changes for certain bases according to mathematical definitions of DST-7 and DCT-8. However, even if the sign changes are removed, such bases can still be called DST-7/DCT-8 because the sign changes do not have an impact on the coding performance.

In this description, when an N-point COT is embedded into an 2N-point DCT-2, a new transform core is also called a COT, which is a 2N-point transform. For example, a 32-point COT may be composed of a 16-point DCT-2 transform and a 16-point DST-7/DCT-8 transform, and a 64-point COT may be composed of either a 32-point DCT-2 and a 32-point COT, or a 32-point DCT-2 and a 32-point DST-7/DCT-8.

For low resolution (e.g., standard-definition) sequences that apply smaller block size coding, DST-4/DCT-4 shows similar/better coding performance than DST-7/DCT-8. For larger resolution (e.g., high-definition) sequences that apply larger block size coding, DST-4/DCT-4 shows worse coding performance than DST-7/DCT-8.

Accordingly, in embodiments, only DST-4/DCT-4 bases are used in an AMT for small transform sizes, and only DST-7/DCT-8 bases are used in the AMT for larger transform sizes. All primary transform bases of different sizes and types can be extracted from one single transform core matrix (e.g., one 64×64 transform core matrix), so there is no additional memory needed for storing transform bases by applying the AMT.

Only DCT-2/COT bases are used in a primary transform when an AMT is not selected. In an example, for transform sizes less than or equal to 16-point, only DCT-2 is used as the primary transform when the AMT is not selected. For transform sizes equal to 32-point, only COT is used as the primary transform when the AMT is not selected, where a transform core of the COT is composed of bases of 16-point DCT-2 and 16-point DCT-8. For transform sizes equal to 64-point, only the COT is used as the primary transform when the AMT is not selected, where the transform core of the COT is composed of bases of 32-point DCT-2 and 32-point DCT-8. In another example, for transform sizes equal to 64-point, only the COT is used as the primary transform when the AMT is not selected, where the transform core of the COT is composed of bases of 32-point DCT-8 and 32-point COT.

Small transform sizes may include, but is not limited to, 2-point, 4-point and/or 8-point.

Larger transform sizes may include, but is not limited to, transform sizes larger than or equal to 8-point. In another example, larger transform sizes may include, but is not limited to, transform sizes larger than or equal to 16-point.

In an embodiment, only one transform set {DST-4, DCT-4} is used in an AMT for small transform sizes.

In an embodiment, only one transform set {DST-7, DCT-8} is used in an AMT for larger transform sizes.

In an embodiment, only one transform set {DST-7, DCT-8} is used in an AMT for coding inter prediction residual blocks.

In an embodiment, only one transform set {DST-7, DCT-8} is used in an AMT for coding intra prediction residual blocks.

In an embodiment, for one coding block, either DST-7 or DST-4 can be selected as a horizontal/vertical transform, either DCT-8 or DCT-4 can be selected as the horizontal/vertical transform, and the selection depends on an intra prediction mode.

In an embodiment, only one transform set {DST-7, DCT-8} is used in an AMT for coding chroma intra prediction residual blocks. In another embodiment, only one transform set {DST-7, DCT-8} is used in an AMT for coding chroma inter prediction residual blocks.

In embodiments, when a signaling of a primary transform (an AMT) and a secondary transform (an NSST) is coupled, a secondary transform selection is coupled with DST-4/DCT-4 for small transform sizes, and the secondary transform selection is coupled with DST-7/DCT-8 for larger transform sizes.

The same embodiments described may also apply to a primary transform in a coupled primary and secondary transform.

A secondary transform may be disabled for certain block sizes. In an example, the certain block sizes include 4×4. In another example, the certain block sizes include 4×8, 8×4.

A secondary transform may be disallowed when a primary transform and the secondary transform are applied on a same number of residuals/coefficients. In an example, when the primary transform size is 8×8, the secondary transform size can be only 4×4, 4×8 or 8×4, which is applied on a lowest 4×4, 4×8 or 8×4 transform coefficients region. In another example, when the primary transform size is 4×8 or 8×4, the secondary transform size can be only 4×4.

A 2×2 NSST may be applied for a 4×4 block, where the 2×2 NSST is associated with a 4×4 transform core matrix.

Figure 6:
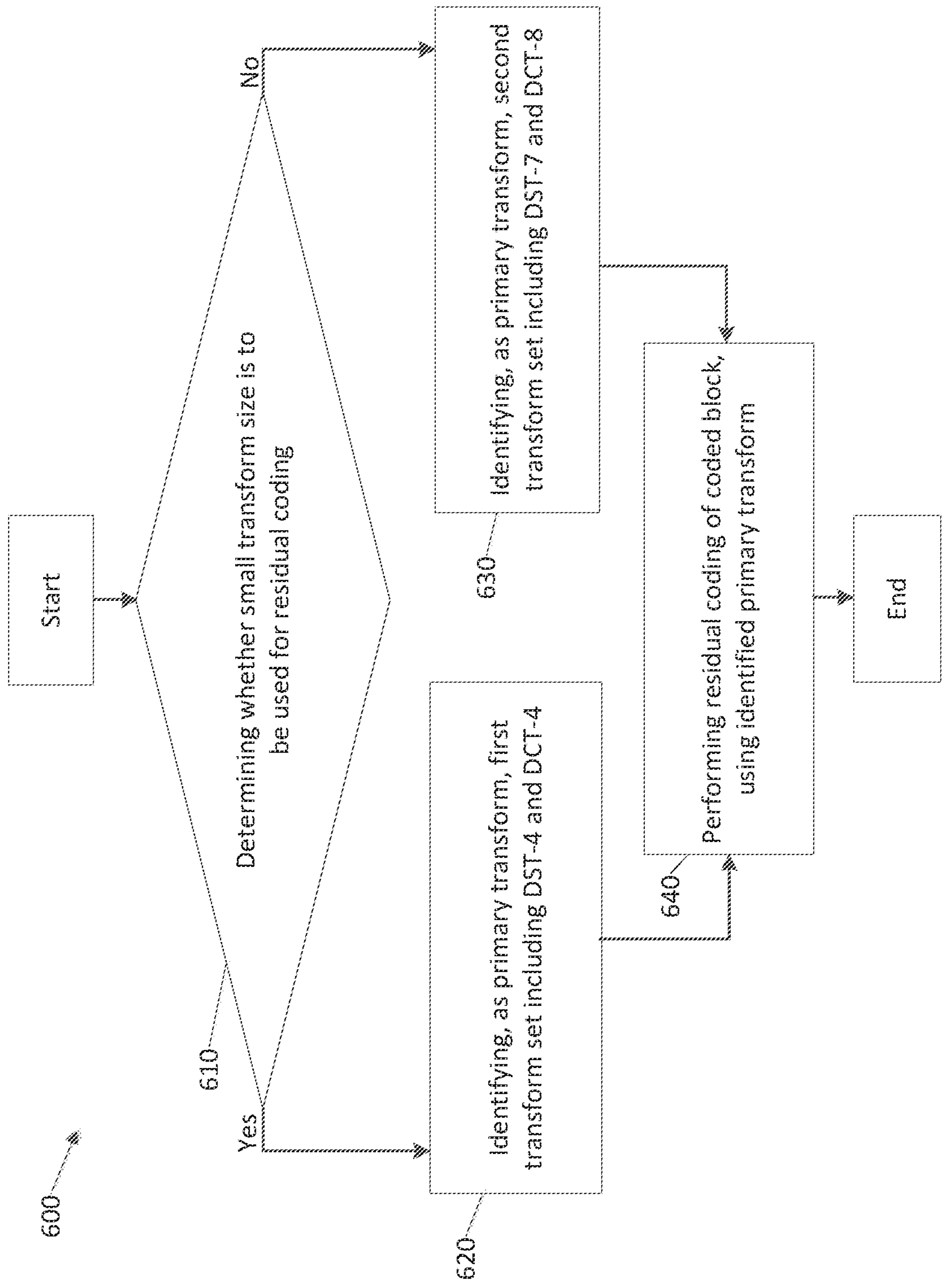
FIG. 6 is a flowchart illustrating a method of controlling residual coding for decoding or encoding of a video sequence, according to an embodiment.

FIG. 6 is a flowchart illustrating a method (600) of controlling residual coding for decoding or encoding of a video sequence, according to an embodiment. In some implementations, one or more process blocks of FIG. 6 may be performed by the decoder (310). In some implementations, one or more process blocks of FIG. 6 may be performed by another device or a group of devices separate from or including the decoder (310), such as the encoder (303).

Referring to FIG. 6, in a first block (610), the method (600) includes determining whether a small transform size of a primary transform is to be used for the residual coding of a coded block of the video sequence.

Based on the small transform size of the primary transform being determined to be used (610-Yes), in a second block (620), the method (600) includes identifying, as the primary transform, a first transform set including discrete sine transform (DST)-4 and discrete cosine transform (DCT)-4.

Based on the small transform size of the primary transform being determined to not be used (610-No), in a third block (630), the method (600) includes identifying, as the primary transform, a second transform set including DST-7 and DCT-8.

In a fourth block (640), the method (600 includes performing the residual coding of the coded block, using the identified primary transform.

The small transform size may be 8-point or smaller.

A large transform size of the primary transform may be 8-point or larger.

A large transform size of the primary transform may be 16-point or larger.

The performing the residual coding may include coding residual blocks of the coded block that is intra or inter coded.

FIG. 7 is a flowchart illustrating a method (700) of controlling residual coding for decoding or encoding of a video sequence, according to another embodiment. In some implementations, one or more process blocks of FIG. 7 may be performed by the decoder (310). In some implementations, one or more process blocks of FIG. 7 may be performed by another device or a group of devices separate from or including the decoder (310), such as the encoder (303).

Referring to FIG. 7, in a first block (710), the method (700) includes determining whether a secondary transform is to be used for the residual coding of the coded block of which the residual coding is performed using the identified primary transform.

Based on the secondary transform being determined to be used (710-Yes), in a second block (720), the method (700) includes determining whether a small transform size of the secondary transform is to be used for the residual coding of the coded block.

Based on the small transform size of the secondary transform being determined to be used (720-Yes), in a third block (730), the method (700) includes identifying, as the secondary transform, the first transform set including the DST-4 and the DCT-4.

Based on the small transform size of the secondary transform being determined to not be used (720-No), in a fourth block (740), the method (700) includes identifying, as the secondary transform, the second transform set including the DST-7 and the DCT-8.

In a fifth block (750), the method (700) includes performing the residual coding of the coded block of which the residual coding is performed using the identified primary transform, using the identified secondary transform.

The primary transform may be an adaptive multiple transform, and the secondary transform may be a non-separable secondary transform.

Although FIGS. 6 and 7 show example blocks of the methods (600) and (700), in some implementations, the methods (600) and (700) may include additional blocks, fewer blocks, different blocks, or differently arranged blocks than those depicted in FIGS. 6 and 7. Additionally, or alternatively, two or more of the blocks of the methods (600) and (700) may be performed in parallel.

Further, the proposed methods may be implemented by processing circuitry (e.g., one or more processors or one or more integrated circuits). In an example, the one or more processors execute a program that is stored in a non-transitory computer-readable medium to perform one or more of the proposed methods.

Figure 8:
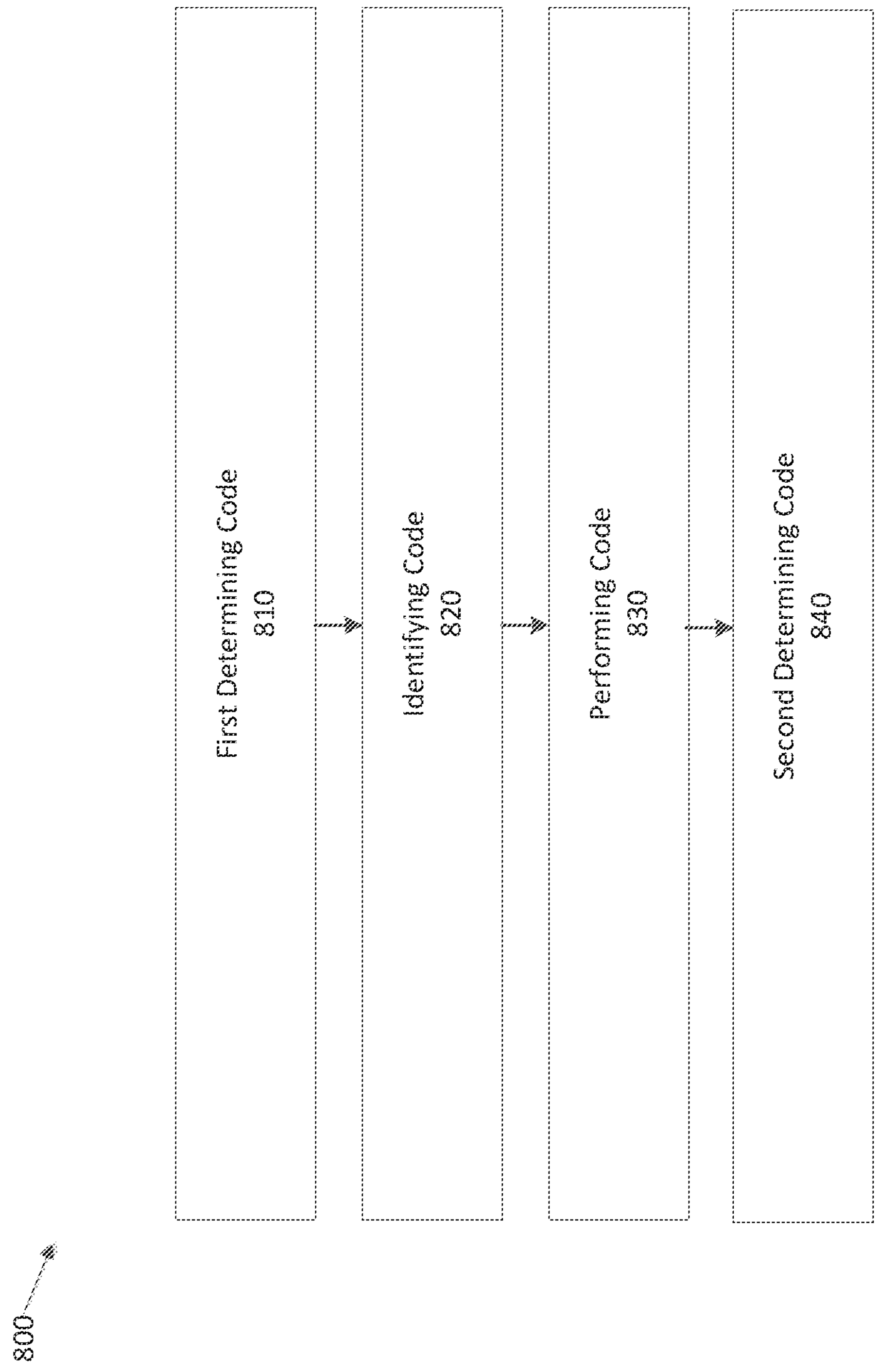
FIG. 8 is a simplified block diagram of an apparatus for controlling residual coding for decoding or encoding of a video sequence, according to an embodiment.

FIG. 8 is a simplified block diagram of an apparatus (800) for controlling residual coding for decoding or encoding of a video sequence, according to an embodiment.

Referring to FIG. 8, the apparatus (800) includes first determining code (810), identifying code (820), performing code (830) and second determining code (840).

The first determining code (810) is configured to cause at least one processor to determine whether a small transform size of a primary transform is to be used for the residual coding of a coded block of the video sequence.

The identifying code (820) is configured to cause the at least one processor to, based on the small transform size of the primary transform being determined to be used, identify, as the primary transform, a first transform set including discrete sine transform (DST)-4 and discrete cosine transform (DCT)-4, and based on the small transform size of the primary transform being determined to not be used, identify, as the primary transform, a second transform set including DST-7 and DCT-8.

The performing code (830) is configured to cause the at least one processor to perform the residual coding of the coded block, using the identified primary transform.

The small transform size may be 8-point or smaller.

A large transform size of the primary transform may be 8-point or larger.

A large transform size of the primary transform is 16-point or larger.

The second determining code (840) is configured to cause the at least one processor to determine whether a secondary transform is to be used for the residual coding of the coded block of which the residual coding is performed using the identified primary transform. The first determining code (810) is further configured to cause the at least one processor to, based on the secondary transform being determined to be used, determine whether a small transform size of the secondary transform is to be used for the residual coding of the coded block. The identifying code (820) is further configured to cause the at least one processor to, based on the small transform size of the secondary transform being determined to be used, identify, as the secondary transform, the first transform set including the DST-4 and the DCT-4, and based on the small transform size of the secondary transform being determined to not be used, identify, as the secondary transform, the second transform set including the DST-7 and the DCT-8. The performing code (830) is further configured to cause the at least one processor to perform the residual coding of the coded block of which the residual coding is performed using the identified primary transform, using the identified secondary transform.

The primary transform may be an adaptive multiple transform, and the secondary transform may be a non-separable secondary transform.

The performing code (830) may be further configured to cause the at least one processor to code residual blocks of the coded block that is intra or inter coded.

The techniques described above, can be implemented as computer software using computer-readable instructions and physically stored in one or more computer-readable media.

Figure 9:
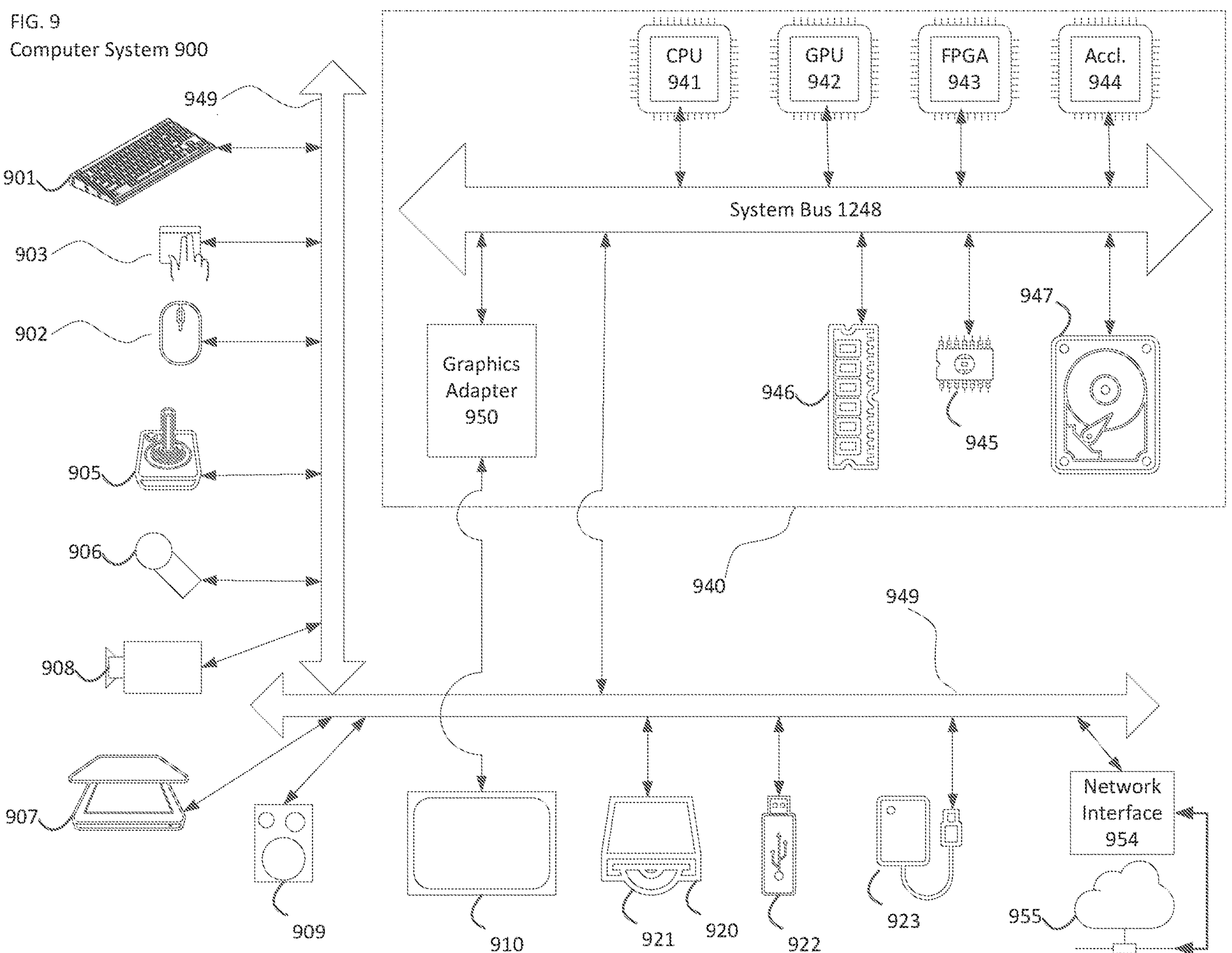
FIG. 9 is a diagram of a computer system suitable for implementing embodiments.

FIG. 9 is a diagram of a computer system (900) suitable for implementing embodiments.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 9 for computer system (900) are exemplary in nature and are not intended to suggest any limitation as to the scope of use or functionality of the computer software implementing embodiments. Neither should the configuration of components be interpreted as having any dependency or requirement relating to any one or combination of components illustrated in the exemplary embodiment of a computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch screen (910), data-glove (904), joystick (905), microphone (906), scanner (907), camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove (904), or joystick (905), but there can also be tactile feedback devices that do not serve as input devices), audio output devices (such as: speakers (909), headphones (not depicted)), visual output devices (such as screens (910) to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (900) can also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term “computer readable media” as used in connection with the presently disclosed subject matter does not encompass transmission media, carrier waves, or other transitory signals.

Computer system (900) can also include interface(s) to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses ((949)) (such as, for example universal serial bus (USB) ports of the computer system (900); others are commonly integrated into the core of the computer system (900) by attachment to a system bus as described below (for example Ethernet interface into a PC computer system or cellular network interface into a smartphone computer system). Using any of these networks, computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (940) of the computer system (900).

The core (940) can include one or more Central Processing Units (CPU) (941), Graphics Processing Units (GPU) (942), specialized programmable processing units in the form of Field Programmable Gate Areas (FPGA) (943), hardware accelerators (944) for certain tasks, and so forth. These devices, along with Read-only memory (ROM) (945), Random-access memory (RAM) (946), internal mass storage such as internal non-user accessible hard drives, solid-state drives (SSDs), and the like (947), may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus (949). Architectures for a peripheral bus include peripheral component interconnect (PCI), USB, and the like.

CPUs (941), GPUs (942), FPGAs (943), and accelerators (944) can execute certain instructions that, in combination, can make up the aforementioned computer code. That computer code can be stored in ROM (945) or RAM (946). Transitional data can also be stored in RAM (946), whereas permanent data can be stored for example, in the internal mass storage (947). Fast storage and retrieve to any of the memory devices can be enabled through the use of cache memory, that can be closely associated with one or more CPU (941), GPU (942), mass storage (947), ROM (945), RAM (946), and the like.

The computer readable media can have computer code thereon for performing various computer-implemented operations. The media and computer code can be those specially designed and constructed for the purposes of embodiments, or they can be of the kind well known and available to those having skill in the computer software arts.

As an example and not by way of limitation, the computer system having architecture (900), and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various embodiments can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hardwired or otherwise embodied in a circuit (for example: accelerator (944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. Embodiments encompass any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of controlling residual coding for decoding or encoding of a video sequence, the method being performed by at least one processor, and the method comprising:

determining a transform size of a primary transform to be used for the residual coding of a coded block of the video sequence;

in response to the transform size of the primary transform being determined to be of 8-point or smaller, automatically performing the residual coding of the coded block, using, as the primary transform, a first transform set consisting both discrete sine transform (DST)-4 and discrete cosine transform (DCT)-4;

in response to a transform size of the primary transform being determined to be of 16-point or larger, automatically performing the residual coding of the coded block, using, as the primary transform, a second transform set consisting both DST-7 and DCT-8;

in response to the residual coding of the coded block being automatically performed, automatically determining whether a secondary transform is to be used for the residual coding of the coded block of which the residual coding is automatically performed using the primary transform;

in response to the secondary transform being determined to be used, automatically determining the transform size of the secondary transform for the residual coding of the coded block;

in response to the transform size of the secondary transform being determined to be of 8-point or smaller, automatically performing the residual coding of the coded block of which the residual coding is automatically performed using the primary transform, using, as the secondary transform, the first transform set consisting both the DST-4 and the DCT-4; and in response to the transform size of the secondary transform being determined to be of 16-point or larger, automatically performing the residual coding of the coded block of which the residual coding is automatically performed using the primary transform, using, as the secondary transform, the second transform set consisting both the DST-7 and the DCT-8.

2. The method of claim 1, wherein the secondary transform is disabled based on a block sizes.

3. The method of claim 1, wherein the secondary transform is disallowed when the primary transform and the secondary transform are applied on a same number of residuals or coefficients.

4. The method of claim 1, wherein only one transform set is used for coding chroma intra prediction residual blocks.

5. The method of claim 1, wherein only one transform set is used for coding chroma inter prediction residual blocks.

6. The method of claim 1, wherein the primary transform is an adaptive multiple transform, and the secondary transform is a non-separable secondary transform.

7. The method of claim 1, wherein the performing the residual coding comprises coding residual blocks of the coded block that is intra or inter coded.

8. An apparatus for controlling residual coding for decoding or encoding of a video sequence, the apparatus comprising:

at least one memory configured to store computer program code; and at least one processor configured to access the at least one memory and operate according to the computer program code, the computer program code comprising:

first determining code configured to cause the at least one processor to determine a transform size of a primary transform to be used for the residual coding of a coded block of the video sequence;

performing code configured to cause the at least one processor to:

in response to the transform size of the primary transform being determined to be of 8-point or smaller, automatically perform the residual coding of the coded block, using, as the primary transform, a first transform set consisting both discrete sine transform (DST)-4 and discrete cosine transform (DCT)-4; and in response to a transform size of the primary transform being determined to be of 16-point or larger, automatically perform the residual coding of the coded block, using, as the primary transform, a second transform set consisting both DST-7 and DCT-8; and second determining code configured to cause the at least one processor to, in response to the residual coding of the coded block being automatically performed, automatically determine whether a secondary transform is to be used for the residual coding of the coded block of which the residual coding is performed using the primary transform, wherein the first determining code is further configured to cause the at least one processor to, in response to the secondary transform being determined to be used, automatically determine the transform size of the secondary transform to be used for the residual coding of the coded block, and wherein the performing code is further configured to cause the at least one processor to:

in response to the transform size of the secondary transform being determined to be of 8-point or smaller, automatically perform the residual coding of the coded block of which the residual coding is automatically performed using the primary transform, using, as the secondary transform, the first transform set consisting both the DST-4 and the DCT-4; and in response to the transform size of the secondary transform being determined to be of 16-point or larger, automatically perform the residual coding of the coded block of which the residual coding is automatically performed using the primary transform, using, as the secondary transform, the second transform set consisting both the DST-7 and the DCT-8.

9. The apparatus of claim 8, wherein the secondary transform is disabled based on a block sizes.

10. The apparatus of claim 8, wherein the secondary transform is disallowed when the primary transform and the secondary transform are applied on a same number of residuals or coefficients.

11. The apparatus of claim 8, wherein only one transform set is used for coding chroma intra prediction residual blocks.

12. The apparatus of claim 8, wherein only one transform set is used for coding chroma inter prediction residual blocks.

13. The apparatus of claim 8, wherein the primary transform is an adaptive multiple transform, and the secondary transform is a non-separable secondary transform.

14. The apparatus of claim 8, wherein the performing code is further configured to cause the at least one processor to code residual blocks of the coded block that is intra or inter coded.

15. A non-transitory computer-readable storage medium storing instructions that cause at least one processor to:

determine a transform size of a primary transform to be used for residual coding of a coded block of a video sequence;

in response to the transform size of the primary transform being determined to be of 8-point or smaller, automatically perform the residual coding of the coded block, using, as the primary transform, a first transform set consisting both discrete sine transform (DST)-4 and discrete cosine transform (DCT)-4;

in response to a transform size of the primary transform being determined to be of 16-point or larger, automatically perform the residual coding of the coded block, using, as the primary transform, a second transform set consisting both DST-7 and DCT-8;

in response to the residual coding of the coded block being automatically performed, automatically determine whether a secondary transform is to be used for the residual coding of the coded block of which the residual coding is automatically performed using the primary transform;

in response to the secondary transform being determined to be used, automatically determine the transform size of the secondary transform to be used for the residual coding of the coded block;

in response to the transform size of the secondary transform being determined to be of 8-point or smaller, automatically perform the residual coding of the coded block of which the residual coding is automatically performed using the primary transform, using, as the secondary transform, the first transform set consisting both the DST-4 and the DCT-4; and in response to the transform size of the secondary transform being determined to be of 16-point or larger, automatically perform the residual coding of the coded block of which the residual coding is automatically performed using the primary transform, using, as the secondary transform, the second transform set consisting both the DST-7 and the DCT-8.

16. The non-transitory computer-readable storage medium of claim 15, wherein the secondary transform is disabled based on a block sizes.

17. The non-transitory computer-readable storage medium of claim 15, wherein the secondary transform is disallowed when the primary transform and the secondary transform are applied on a same number of residuals or coefficients.

18. The non-transitory computer-readable storage medium of claim 15, wherein only one transform set is used for coding chroma intra prediction residual blocks.

19. The non-transitory computer-readable storage medium of claim 15, wherein only one transform set is used for coding chroma inter prediction residual blocks.

20. The non-transitory computer-readable storage medium of claim 15, wherein the instructions further cause the at least one processor to code residual blocks of the coded block that is intra or inter coded.

* * * * *